(12) United States Patent
Mikawa

(10) Patent No.: US 9,410,488 B2
(45) Date of Patent: Aug. 9, 2016

(54) VARIABLE VALVE TIMING CONTROL DEVICE FOR INTERNAL COMBUSTION ENGINE, AND CONTROL METHOD

(71) Applicant: Hitachi Automotive Systems, Ltd., Hitachinaka-shi, Ibaraki (JP)

(72) Inventor: Kentaro Mikawa, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/432,284

(22) PCT Filed: Mar. 7, 2014

(86) PCT No.: PCT/JP2014/055933
§ 371 (c)(1),
(2) Date: Mar. 30, 2015

(87) PCT Pub. No.: WO2014/196237
PCT Pub. Date: Dec. 11, 2014

(65) Prior Publication Data
US 2015/0233306 A1 Aug. 20, 2015

(30) Foreign Application Priority Data
Jun. 6, 2013 (JP) ................ 2013-120036

(51) Int. Cl.
*F02D 13/02* (2006.01)
*F02D 41/00* (2006.01)

(52) U.S. Cl.
CPC ........ *F02D 13/0203* (2013.01); *F02D 13/0215* (2013.01); *F02D 13/0234* (2013.01); *F02D 13/0249* (2013.01); *F02D 2041/001* (2013.01)

(58) Field of Classification Search
CPC ........... F02D 13/0203; F02D 13/0215; F02D 13/0219; F02D 13/0223; F02D 13/0234; F02D 13/0238; F02D 13/0242; F02D 13/0249; F02D 2041/001; F02D 2041/2048
See application file for complete search history.

(56) References Cited

U.S. PATENT DOCUMENTS

| 7,403,849 B1 | 7/2008 | Watanabe et al. |
| 2007/0283925 A1* | 12/2007 | Nagashima ........... F01L 1/3442 123/406.12 |
| 2008/0189022 A1 | 8/2008 | Watanabe et al. |
| 2009/0210137 A1 | 8/2009 | Kokubo et al. |

FOREIGN PATENT DOCUMENTS

| JP | 10-318004 | 12/1998 |
| JP | 2004-162706 A | 6/2004 |
| JP | 2005-233153 | 9/2005 |

(Continued)

OTHER PUBLICATIONS

Japanese Office Action dated May 17, 2016 issued in corresponding Japanese Application No. 2013-120036.

*Primary Examiner* — Erick Solis
*Assistant Examiner* — Anthony L Bacon
(74) *Attorney, Agent, or Firm* — Foley & Lardner LLP

(57) ABSTRACT

The present invention relates to variable valve timing control device and control method, which change valve timing of an internal combustion engine. An operation amount for controlling the valve timing is computed, and an operation amount computed at position detection timing of a valve timing control system is divided and output until next position detection timing.

10 Claims, 22 Drawing Sheets

(56) References Cited

FOREIGN PATENT DOCUMENTS

| | | |
|---|---|---|
| JP | 2007-162479 | 6/2007 |
| JP | 2008-190385 | 8/2008 |
| JP | 2009-197591 | 9/2009 |
| JP | 2010-180766 | 8/2010 |

\* cited by examiner

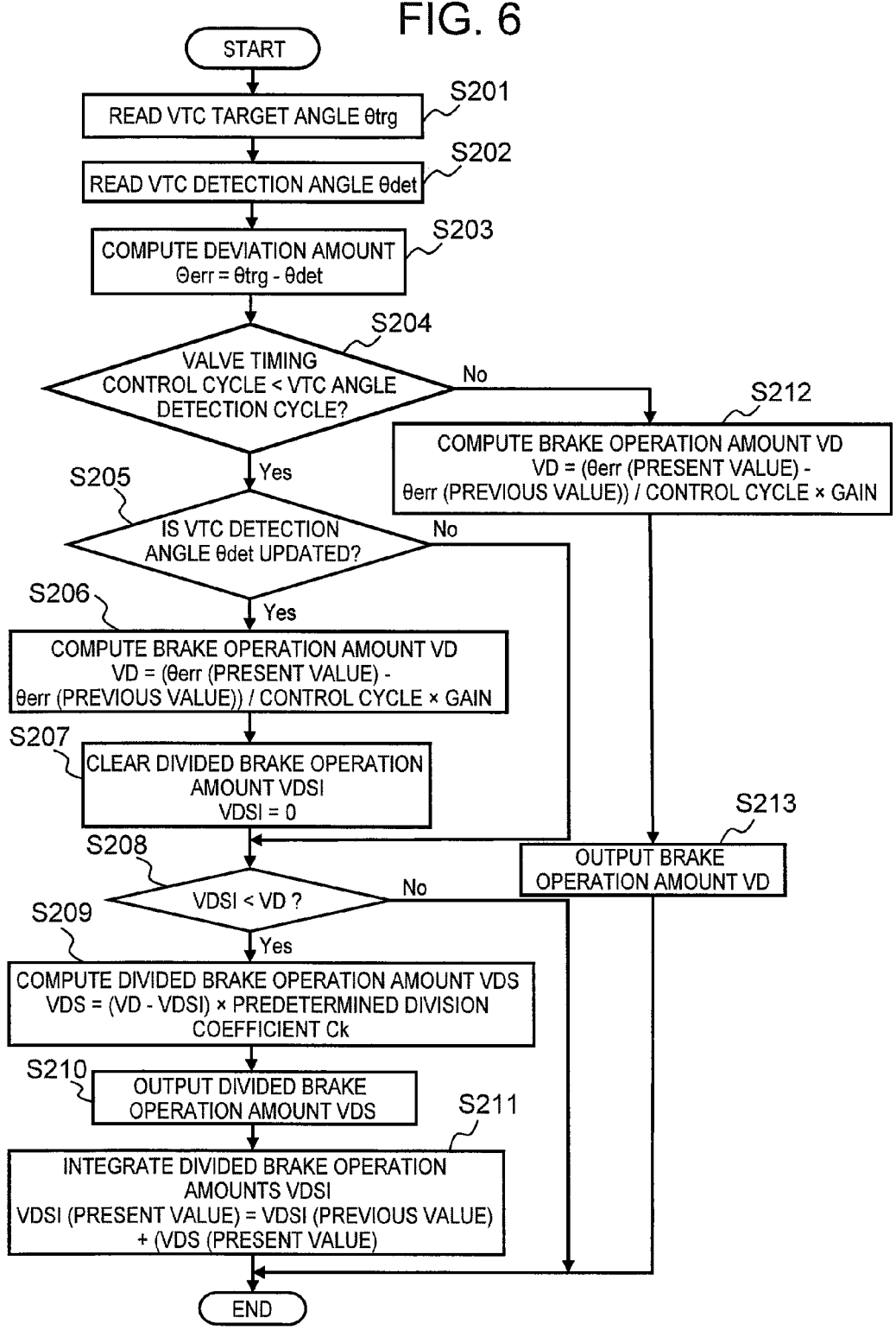

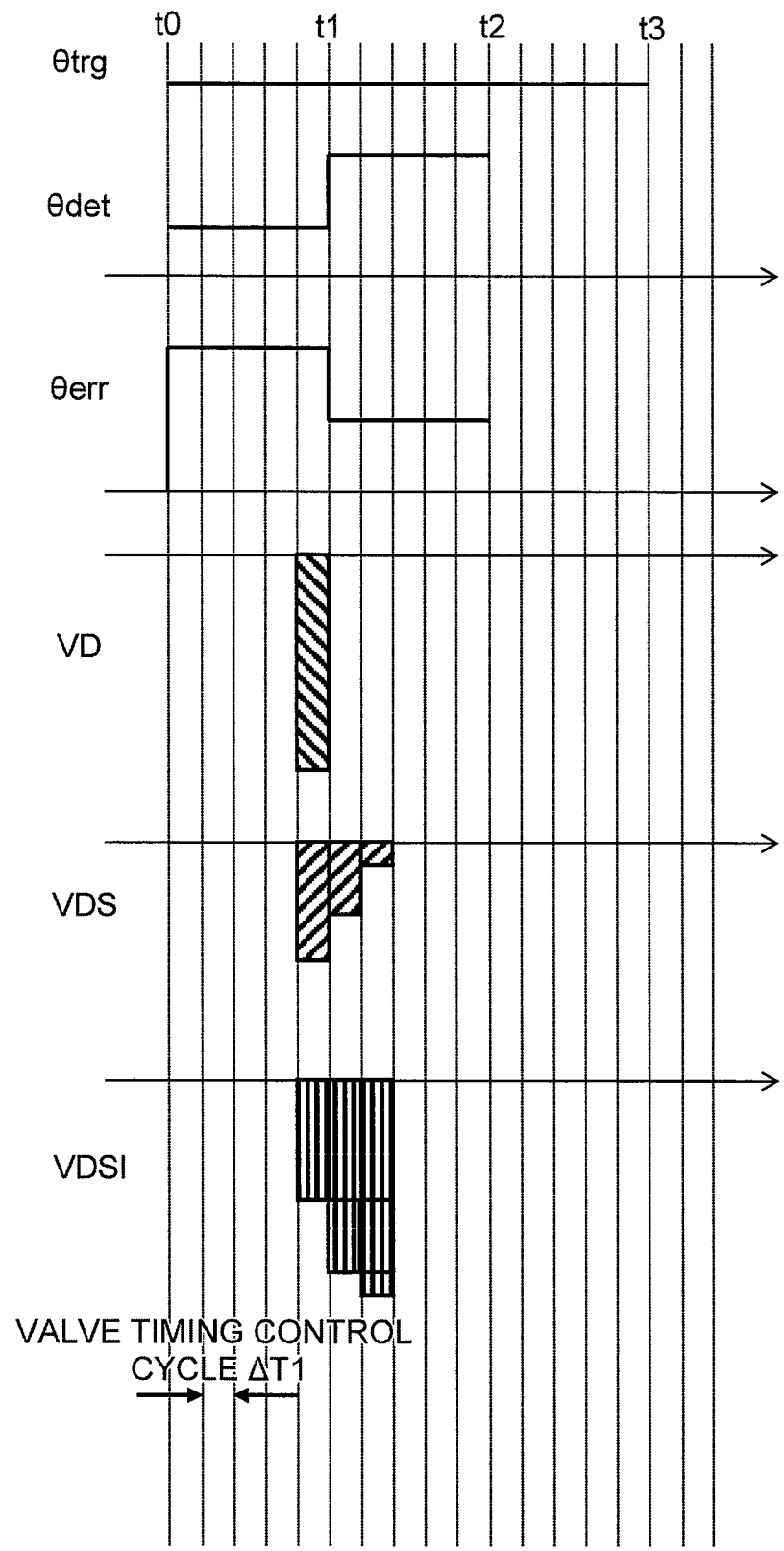

VARIABLE VALVE TIMING CONTROL DEVICE FOR INTERNAL COMBUSTION ENGINE, AND CONTROL METHOD

TECHNICAL FIELD

The present invention relates to variable valve timing control device and control method, which change valve timing of an internal combustion engine.

BACKGROUND ART

Heretofore, in a device that controls an electric actuator for use in a variable valve device or the like of an internal combustion engine (engine), for example, there has been known a technique as in Patent Document 1, in which a sensor that measures a position of a valve timing control system (VTC) is provided, and the position is controlled to a target position based on a measurement result of the sensor. In Patent Document 1, a motor rotation speed sensor is provided in a motor for varying a turning speed of a planetary gear in a phase variable mechanism, and a position of the VTC is detected by a rotation signal of a motor shaft, in which a detection frequency is higher than that of a rotation signal of a camshaft.

As described above, the motor rotation speed sensor is provided, whereby such a VTC position can be detected even during a period while the rotation signal of the camshaft cannot be detected, and a valve timing control with good accuracy in a low revolution range of the engine is realized. A VTC position detection system composed by addition of the sensor as described above does not depend on the number of revolutions of the engine, and accordingly, can ensure controllability even at the time when the number of revolutions of the engine is low.

REFERENCE DOCUMENT LIST

Patent Document

Patent Document 1: Japanese Patent Application Laid-open Publication No. 2004-162706

SUMMARY OF THE INVENTION

Problems to be Solved by the Invention

In addition, in some case, such an additional sensor that detects the VTC position is omitted due to a customer's request and a request for an inexpensive system. In such a case, valve timing is controlled by using a crank angle sensor and the like. Then, target valve timing is computed in response to operation conditions of the engine, and in addition, actual valve timing is detected at position measurement timing by the crank angle sensor, and is converged to a target value (target valve timing) by being subjected to a feedback control by a differentiation amount corresponding to a deviation thereof from the above-described target valve timing.

However, a position measurement frequency of the crank angle sensor is low, and accordingly, a control using a large differentiation amount is required in order to ensure controllability at the time when the engine starts (at the time when the engine is cranked) and when the number of engine revolutions is low. Therefore, countermeasures against an influence of increase of an effective current or a current variation have been regarded as a subject.

That is to say, in a case where the additional sensor is not employed, in a convergence control such as a PID control, a large differentiation amount (brake) is required in order to converge the actual valve timing to the target value without any overshoot. Because of the large differentiation amount, the effective current is increased, whereby a design margin for motor heat resistance is lost, and in addition, electric power consumption is increased, whereby a fuel consumption reduction effect is lost. Moreover, it is also apprehended that demagnetization of a motor magnet may occur if the current variation is large.

The present invention has been made in consideration of such circumstances as described above. It is an object of the present invention to provide variable valve timing control device and control method, which are capable of suppressing the increase of the effective current or the current variation while maintaining a brake function without adding the sensor for detecting the VTC position.

Means for Solving the Problems

Variable valve timing control device and control method of an internal combustion engine according to the present invention compute an operation amount for controlling valve timing, and divide and output an operation amount, which is computed at position detection timing of a valve timing control system, until next position detection timing, wherein, with regard to division of the operation amount, a division method of the operation amount is switched so that the effective current cannot be increased when an environmental temperature reaches a high temperature, or is switched in response to a drive power supply voltage for a motor that drives the valve timing control system, and a number of divisions of the operation amount is increased when the drive power supply voltage for the motor that drives the valve timing control system is low.

Effects of the Invention

In the present invention, the operation amount computed at the position detection timing of the valve timing control system is not collectively imparted, but is divided and output until the next position detection timing. In such a way, a peak value of the operation amount can be lowered, the effective current can be reduced, and in addition, the current variation can be reduced, and such countermeasures against phenomena which have occurred concomitantly can be reduced or discontinued.

BRIEF DESCRIPTION OF THE DRAWINGS

FIG. 6 is a flowchart illustrating a procedure of calculating a brake operation amount in a variable valve timing control device of an internal combustion engine according to a second embodiment of the present invention.

FIG. 7 is a timing chart of respective signals in the flowchart illustrated in FIG. 6.

MODE FOR CARRYING OUT THE INVENTION

A description is made below of embodiments of the present invention with reference to the drawings.

[First Embodiment]

Figure 1:
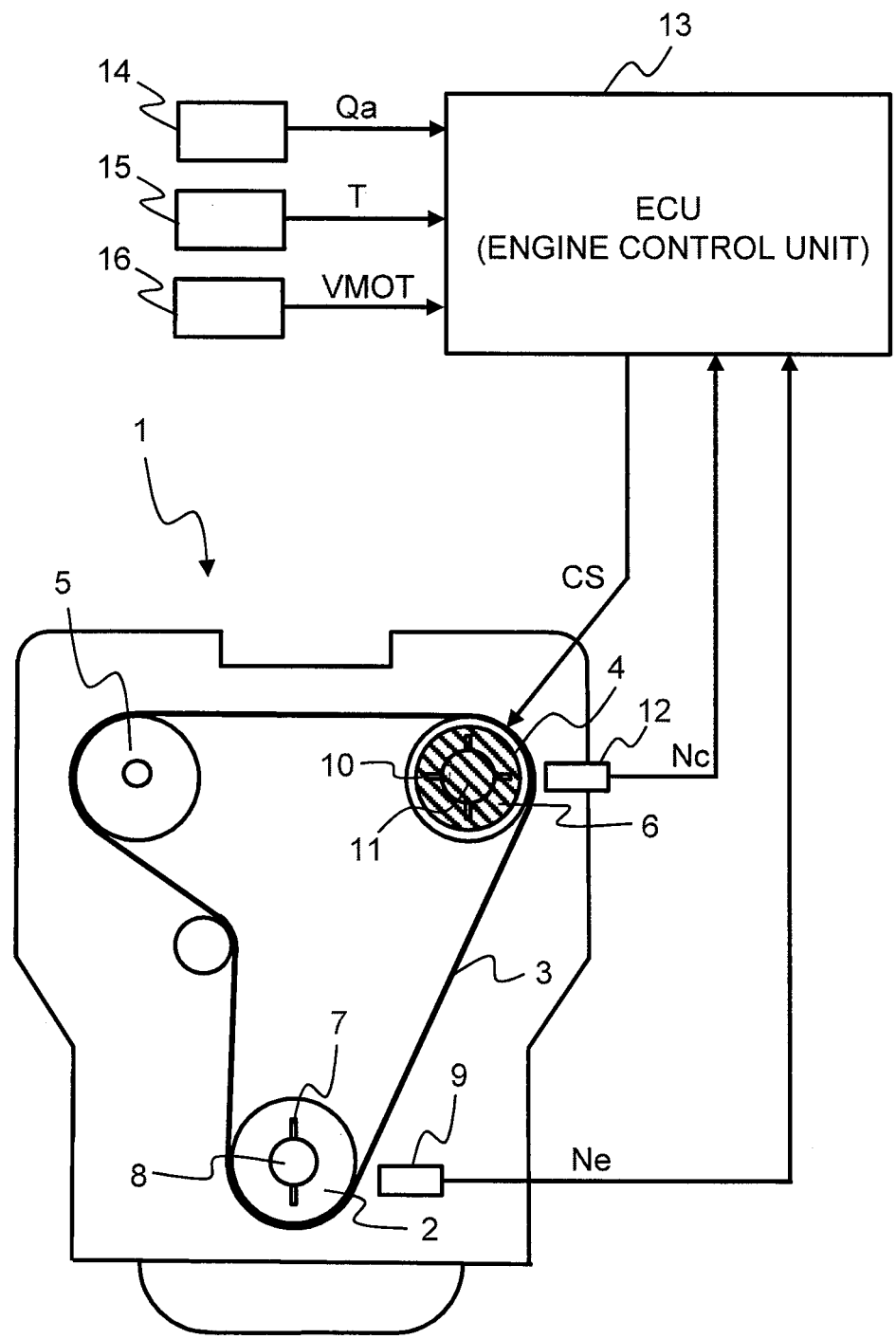
FIG. 1 is a schematic view illustrating a system configuration of a vehicle engine subjected to application of a variable valve timing control device of an internal combustion engine according to embodiments of the present invention.

FIG. 1 is a schematic view illustrating a system configuration of a vehicle engine subjected to application of a variable valve timing control device of an internal combustion engine according to the embodiments of the present invention. FIG. 1 extracts and illustrates a portion related to a control for an electric actuator for use in a valve timing control system.

Power from a crankshaft 2 of an engine (internal combustion engine) 1 is transmitted through a timing chain (or a timing belt) 3 to an intake camshaft 4 and an exhaust camshaft 5. Then, an intake valve is driven to open following rotation of intake camshaft 4, and an exhaust valve is driven to open following rotation of exhaust camshaft 5.

In intake camshaft 4, a valve timing control system (VTC) 6 is provided, which changes a center phase of an operating angle of the intake valve by changing a rotation phase of intake camshaft 4 with respect to crankshaft 2. This VTC 6 makes advance/retard changes for the center phase of such a valve operating angle of the intake valve without changing the valve operating angle and a valve lift amount. Here, VTC 6 is provided on an intake camshaft 4 side; however, may be provided on an exhaust camshaft 5 side.

Moreover, on crankshaft 2, a signal plate 8 on which a detection target portion (for example, a protruding portion) 7 is provided, is axially supported, and in addition, a crank angle sensor 9 that detects this detection target portion 7 is provided.

Furthermore, on intake camshaft 4, a signal plate 11 on which a detection target portion (for example, a protruding portion) 10 is provided, is axially supported, and in addition, a cam angle sensor 12 that detects this detection target portion 10 is provided.

A detection signal Ne of crank angle sensor 9 and a detection signal Nc of cam angle sensor 12 are individually input to an engine control unit (ECU) 13 that controls engine 1. To this ECU 13, detection signals (an intake air volume Qa, an environmental temperature T, and a drive power voltage VMOT) are individually input from an air flow meter 14 that detects an intake air volume of engine 1, a temperature sensor 15 that measures an environmental temperature, a voltmeter 16 that measures a power supply voltage for driving a motor of such an electric VTC, and the like.

Based on the detection signals of a variety of the above-described sensors, ECU 13 executes a control program stored in a storage device such as a Read Only Memory (ROM) and a flash memory, and thereby performs a variety of controls for engine 1.

Then, ECU 13 calculates a number of engine revolutions RPM based on the detection signal Ne output from crank angle sensor 9, performs a fuel injection control and an ignition control based on the calculated number of engine revolutions RPM, the intake air volume Qa detected by the air flow meter 14, and the like, and in addition, performs a control for valve timing by supplying a control signal CS to VTC 6.

In the control for VTC 6, a convergence control such as a PID control is used, where target valve timing (target advanced angle quantity) is computed based on the number of engine revolutions RPM, the intake air volume Qa and the like, and in addition, actual valve timing (actual advanced angle quantity) is detected based on the detection signals Ne and Nc output from crank angle sensor 9 and cam angle sensor 12, and an operation amount of VTC 6, for example, a brake operation amount (differentiation amount in a case of the PID control) is calculated in response to a deviation between the target valve timing and the actual valve timing, which are described above, whereby a feedback control is performed.

In this event, for example, a duty ratio of the control signal CS is changed, whereby the center phase (valve timing) of the valve operating angle of the intake valve is changed to a freely selected position between a most retarded angle position to a most advanced angle position.

As described above, ECU 13 acts as a control unit that has a function as a control device for VTC 6. Moreover, in the control for VTC 6, crank angle sensor 9 and cam angle sensor 12 function as measuring means for periodically measuring the valve timing.

Next, a description is made in detail of the control for VTC 6, which is executed by ECU 13, while exemplifying a case where the operation amount for controlling the valve timing is the brake operation amount.

Figure 2:
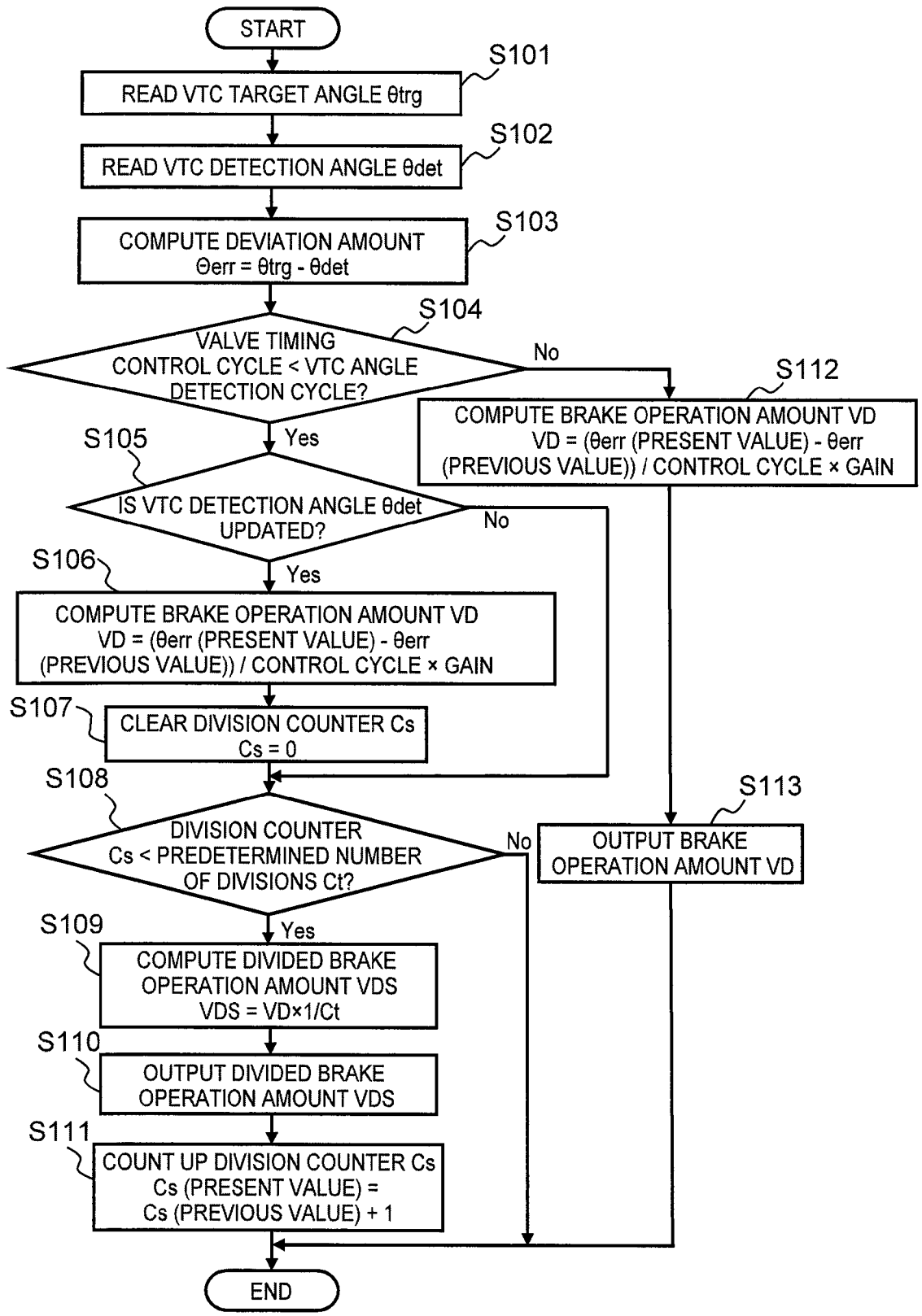
FIG. 2 is a flowchart illustrating a procedure of calculating a brake operation amount in a variable valve timing control device of an internal combustion engine according to a first embodiment of the present invention.
Figure 3:
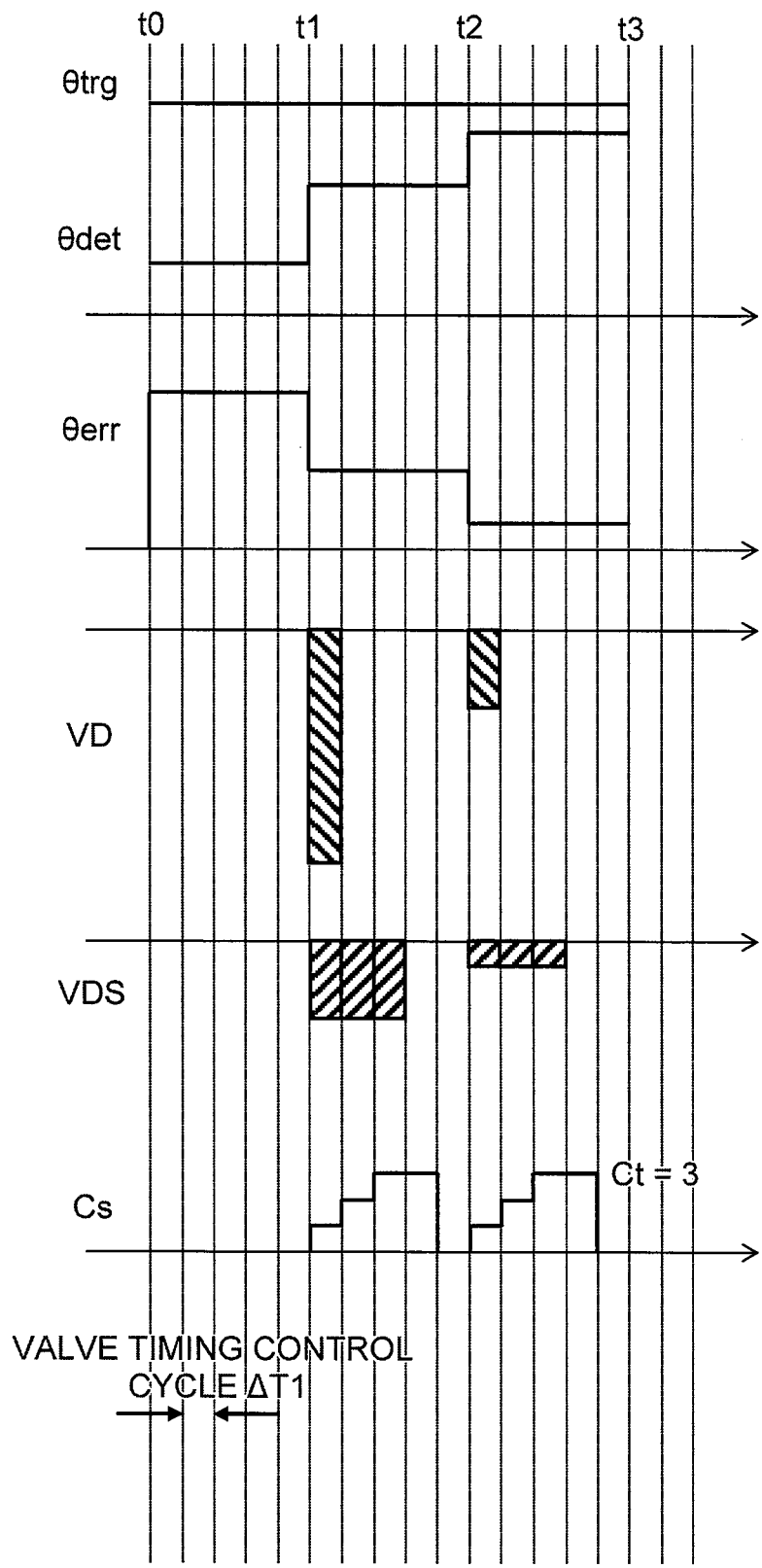
FIG. 3 is a timing chart of respective signals in the flowchart illustrated in FIG. 2.

FIG. 2 is a flowchart illustrating a procedure of calculating the brake operation amount in the variable valve timing control device of the internal combustion engine according to the first embodiment of the present invention. Moreover, FIG. 3 is a timing chart of respective signals in the flowchart illustrated in FIG. 2.

First, in Step S101, a target angle $\theta_{trg}$, which is calculated by ECU 13 based on the number of engine revolutions RPM, the intake air volume Qa and the like, is read. This target angle $\theta_{trg}$ is a predetermined value as illustrated in FIG. 3.

In Step S102, a detection angle $\theta_{det}$ that is based on the detection signal Nc output from cam angle sensor 12 is read. As illustrated in FIG. 3, the detection angle $\theta_{det}$ is constant values during a period from respective pieces of VTC position detection time t0, t1, t2 until next pieces of timing, and rises step by step toward the target angle $\theta_{trg}$.

In Step S103, a deviation amount $\theta_{err}$ ($\theta_{err}=\theta_{trg}-\theta_{det}$) between the target angle $\theta_{trg}$ and the detection angle $\theta_{det}$ is computed by ECU 13. This deviation amount $\theta_{err}$ is lowered step by step by the fact that a difference between the target angle $\theta_{trg}$ and the detection angle $\theta_{det}$ gradually becomes small.

In the next Step S104, it is determined whether or not a valve timing control cycle $\Delta T1$ is smaller than a VTC angle detection cycle. This is in order to reduce a load to ECU 13, which is caused by computation, by applying the present invention only when the number of revolutions of engine 1 is low.

In a case where the valve timing control cycle $\Delta T1$ is smaller than the VTC angle detection cycle, then the processing proceeds to Step S105, where it is determined whether or not the detection angle $\theta_{det}$ of the VTC is updated.

Then, when it is determined that the detection angle $\theta_{det}$ of VTC 6 is updated, then the processing proceeds to Step S106, where a brake operation amount VD, for example, the differentiation amount is computed. This brake operation amount VD is represented by the following Expression (1).

$$VD=(\theta_{err}(\text{present value})-\theta_{err}(\text{previous value}))/\text{control cycle}\times\text{gain} \quad (1)$$

As illustrated in FIG. 3, the brake operation amount VD gradually becomes small in response to that the difference between the detection angle $\theta_{det}$ and the target angle $\theta_{trg}$ gradually becomes small.

In the next Step S107, a division counter Cs is cleared (Cs=0). This division counter Cs sets how many times the brake operation amount VD is to be output divisionally, and FIG. 3 illustrates an example of dividing the brake operation amount VD into three pieces.

In Step S108, it is determined whether or not a count value of the division counter Cs is smaller than a predetermined division number Ct. Moreover, also when it is determined in Step S105 that the detection angle $\theta_{det}$ of VTC 6 is not updated, in other words, also when it is determined that the detection angle $\theta_{det}$ stays within the present VTC angle detection cycle, it is determined whether or not the count value of the division counter Cs is smaller than the predetermined division number Ct.

In a case where the count value of the division counter Cs is smaller than the predetermined division number Ct, then the processing proceeds to Step S109, where divided brake operation amounts VDS are computed. This computation is executed in accordance with the following Expression (2).

Meanwhile, in a case where the count value of the division counter Cs is larger than the predetermined division number Ct, then the processing is ended since the count value has exceeded the division number.

$$VDS=VD\times 1/Ct \quad (2)$$

In Step S110, each divided brake operation amount VDS calculated in accordance with the above-described Expression (2) is output. This divided brake operation amount VDS is ⅓ of the brake operation amount VD as illustrated in FIG. 3.

In Step S111, the division counter Cs is counted up (Cs (present value)=Cs (previous value)+1), and the present processing for the valve timing control cycle $\Delta T1$ is ended.

When it is determined in the above-described Step S104 that the valve timing control cycle $\Delta T1$ is larger than the VTC angle detection cycle, then the processing proceeds to Step S112, where the brake operation amount VD, for example, the differentiation amount is computed. This brake operation amount VD is represented by the following Expression (3).

$$VD=(\theta_{err}(\text{present value})-\theta_{err}(\text{previous value}))/\text{control cycle}\times\text{gain} \quad (3)$$

Then, the brake operation amount VD is output in Step S113, and the present valve timing control cycle $\Delta T1$ is ended.

When the number of revolutions of engine 1 is low, the processing of Steps S101 to S111, which are mentioned above, is repeated for each valve time control cycle $\Delta T1$, whereby the divided brake operation amounts VDS, which are obtained by dividing the brake operation amount VD into plural pieces (three in this example) as illustrated in FIG. 3, are output divisionally plural times in response to each of position detection intervals t0-t1, t1-t2, t2-t3 . . . within each VTC angle detection cycle. FIG. 3 illustrates an example of outputting the divided brake operation amounts VDS divisionally three times in each of the intervals t1-t2 and t2-t3.

Meanwhile, when the number of revolutions of engine 1 is high, the brake operation amount VD is output at the position detection timing of the VTC without being divided as illustrated in Steps S112 and S113.

FIGS. 4A to 4D are waveform diagrams of a cam phase angle, a control voltage, a motor current and the differentiation amount in the present invention.

FIGS. 5A to 5D are comparative examples, illustrating waveform diagrams of a cam phase angle, a control voltage, a motor current and a differentiation amount in a conventional case (case of collectively imparting the operation amount).

Figure 4A:
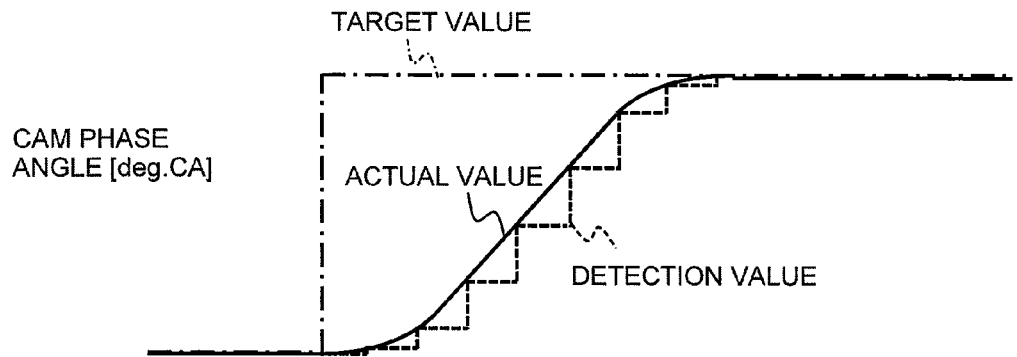
FIGS. 4A to 4D are waveform diagrams of a cam phase angle, a control voltage, a motor current and a differentiation amount in the present invention.
Figure 5A:
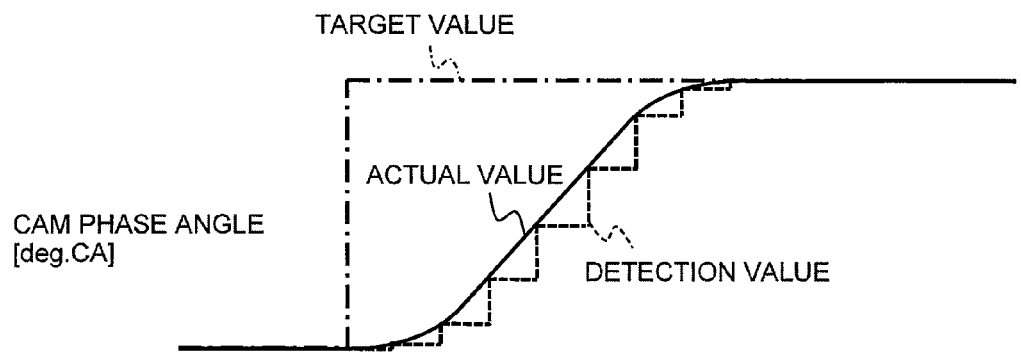
FIGS. 5A to 5D are waveform diagrams of a cam phase angle, a control voltage, a motor current and a differentiation amount in a comparative example.
Figure 5B:
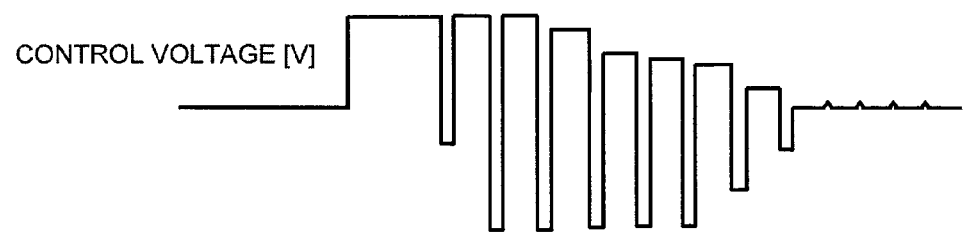

As illustrated in FIG. 4A and FIG. 5A, with regard to the cam phase angle [deg.CA], when the number of revolutions of engine 1 is low, an actual value (actual valve timing) thereof rises gently with respect to a target value (target valve timing) thereof, and in low-frequency VTC position detection by crank angle sensor 9, a step-like detection value is obtained, which approaches the target value for each of the VTC angle detection cycles.

Figure 4B:

In this first embodiment, with regard to the control voltage [V] at this time, as illustrated in FIG. 4B, the brake operation amount VD is divided divisionally plural times in response to the VTC angle detection cycle, and is output for each of the valve timing control cycles $\Delta T1$. In such a way, as apparent from comparison with FIG. 5B, a time while the brake operation amount VD remains on a peak thereof is shortened.

Figure 4C:
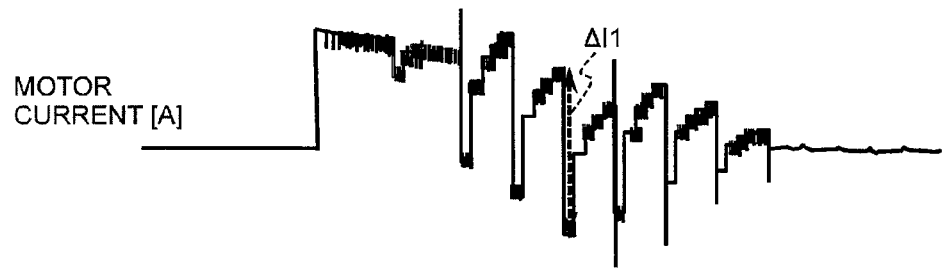
Figure 5C:
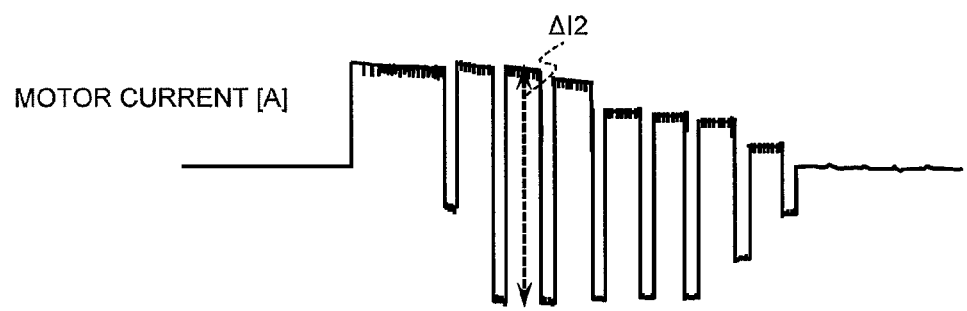

Moreover, with regard to the motor current [A], as illustrated in FIG. 4C and FIG. 5C in comparison therebetween, the effective current is decreased, and a current variation $\Delta I1$ also becomes smaller than a conventional current variation $\Delta I2$.

Figure 4D:
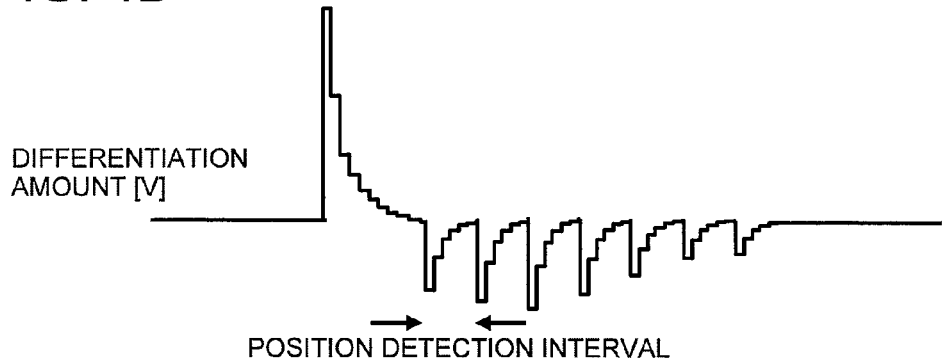
Figure 5D:
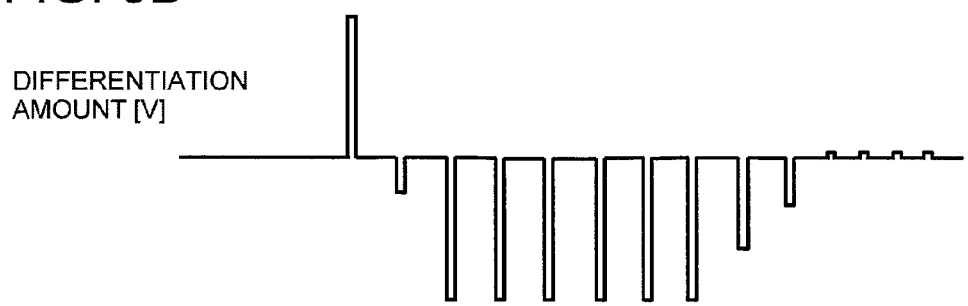

The differentiation amount (brake operation amount) [V] at this time becomes small by being output while being output into plural pieces as illustrated in FIG. 4D and FIG. 5D in comparison therebetween.

Hence, in accordance with the above-mentioned first embodiment, the large differentiation amount (brake operation amount) computed at the VTC position detection timing is gradually output in such a section until the next VTC position detection timing (=differentiation amount computation timing), whereby the effective current and the current variation can be reduced while maintaining the brake function by the differentiation amount. In this way, a balance can be struck between securement of VTC response performance by differential braking and the reduction of the effective current. Moreover, the brake operation amount is divided only when the number of engine revolutions is low, whereby a computation load of ECU 13 can be reduced.

Note that, since the brake operation amount (differentiation amount) just needs to be divided in a fixed ratio, the number of divisions thereof just needs to be set at two or more, and to be set equal to or less than the number of computations within the angle detection cycle. In this event, a cycle of the divisional outputs is set equal to or more than a computation cycle.

The divisional outputs of the above-described brake operation amount (differentiation amount) can be realized, for example, by a low-pass filter, and a ratio of the division can be set by a filter coefficient. A cutoff frequency, a gain coefficient and the like apply to the filter coefficient, and the divisional outputs can be obtained by setting the cutoff frequency and the gain coefficient.

[Second Embodiment]

FIG. 6 is a flowchart illustrating a procedure of calculating a brake operation amount in a variable valve timing control device of an internal combustion engine according to a second embodiment of the present invention. Moreover, FIG. 7 is a timing chart of respective signals in the flowchart illustrated in FIG. 6.

In the above-mentioned first embodiment, the brake operation amount VD is divided in the fixed ratio, and meanwhile, in this second embodiment, the brake operation amount VD is divided so that the divided brake operation amounts VDS can be initially large and gradually smaller.

Steps S201 to S206, S212 and S213 are similar to Steps S101 to S106, S112 and S113, respectively, and accordingly, a description thereof is omitted.

In Step S207, an integrated value VDSI of the divided brake operation amounts is cleared (VDSI=0).

Then, in Step S208, it is determined whether or not the integrated value VDSI of the divided brake operation amounts VDS is smaller than the brake operation amount VD. If the integrated value VDSI is smaller than the brake operation amount VD, then the integrated value VDSI does not still reach the brake operation amount VD required for the convergence, and accordingly, the processing proceeds to Step S209. If the integrated value VDSI is larger than the brake operation amount VD, then the integrated value VDSI has exceeded the brake operation amount VD, and accordingly, the present value timing control cycle $\Delta T1$ is ended.

In Step S209, the divided brake operation amount VDS is computed. This divided brake operation amount VDS is represented by the following Expression (4).

$$VDS = (VD - VDSI) \times \text{predetermined division coefficient } Ck \quad (4)$$

In this second embodiment, as illustrated in FIG. 7, such divided brake operation amounts VDS are made initially large, and thereafter, are made gradually smaller. The integrated value VDSI of the divided brake operation amounts VDS is substantially equalized to the brake operation amount VD, for example, at the time when the number of divisions reaches a predetermined number.

In the next Step S210, the divided brake operation amount VDS is output.

In Step S211, the integrated value VDSI of the divided brake operation amounts is computed. This integrated value VDSI of the divided brake operation amounts is represented by the following Expression (5).

$$VDSI \text{ (present value)} = VDSI \text{ (previous value)} + VDS \text{ (present value)} \quad (5)$$

Then, operations of the above-described Steps S201 to S213 are repeated for each valve time control cycle $\Delta T1$.

In accordance with such a control as described above, the brake operation amount VD computed in Step S206 is output largely in an initial period (at first or at early timing) within a range where the operation amount is not saturated, whereby the brake can be applied earlier in comparison with the first embodiment, and the actual valve timing can be converged to the target value in a short time.

[Third Embodiment]

Figure 8:
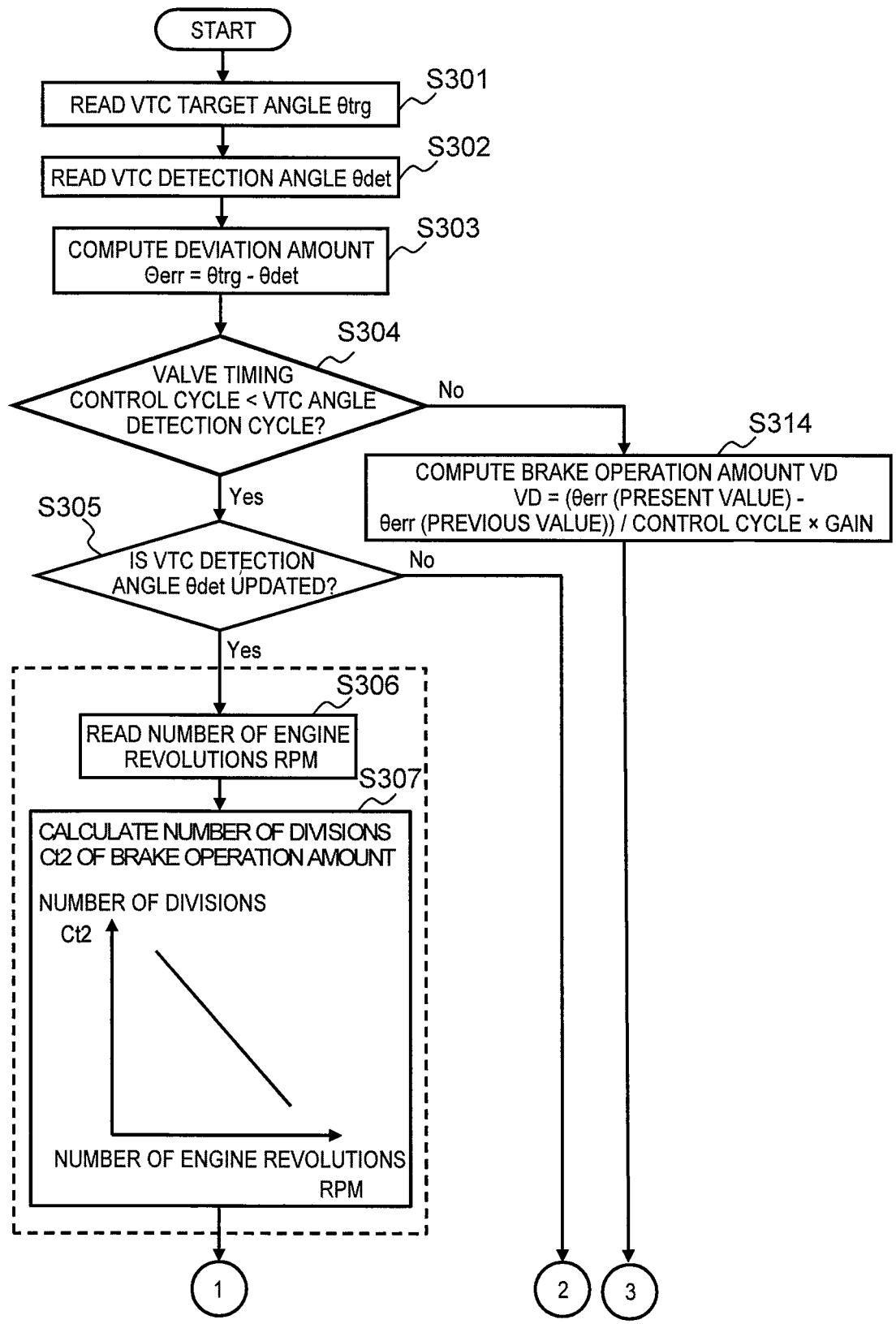
FIG. 8 is a flowchart illustrating a part of a procedure of calculating a brake operation amount in a variable valve timing control device of an internal combustion engine according to a third embodiment of the present invention.
Figure 9:
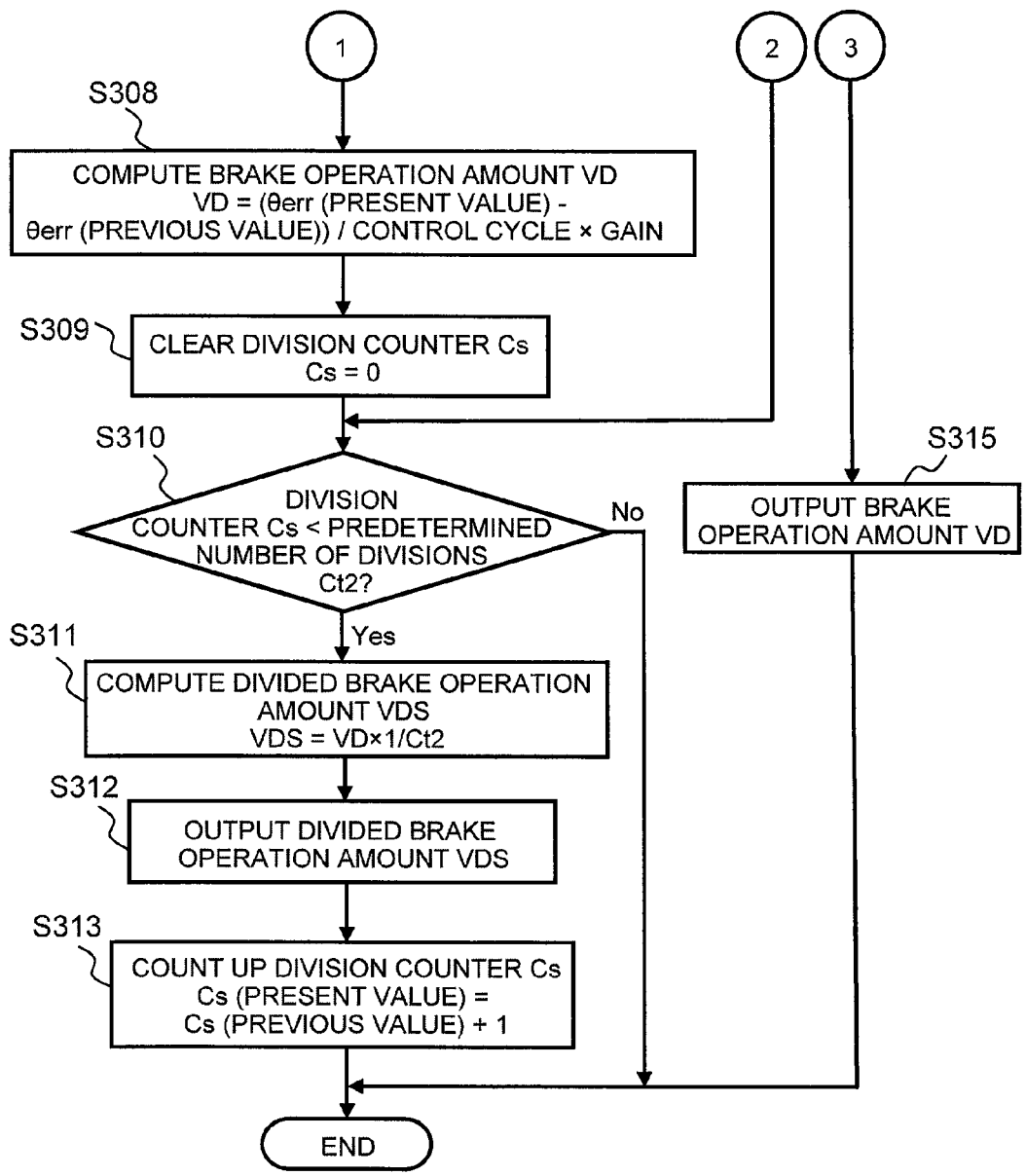
FIG. 9 is a flowchart illustrating a procedure subsequent to FIG. 8.
Figure 10:
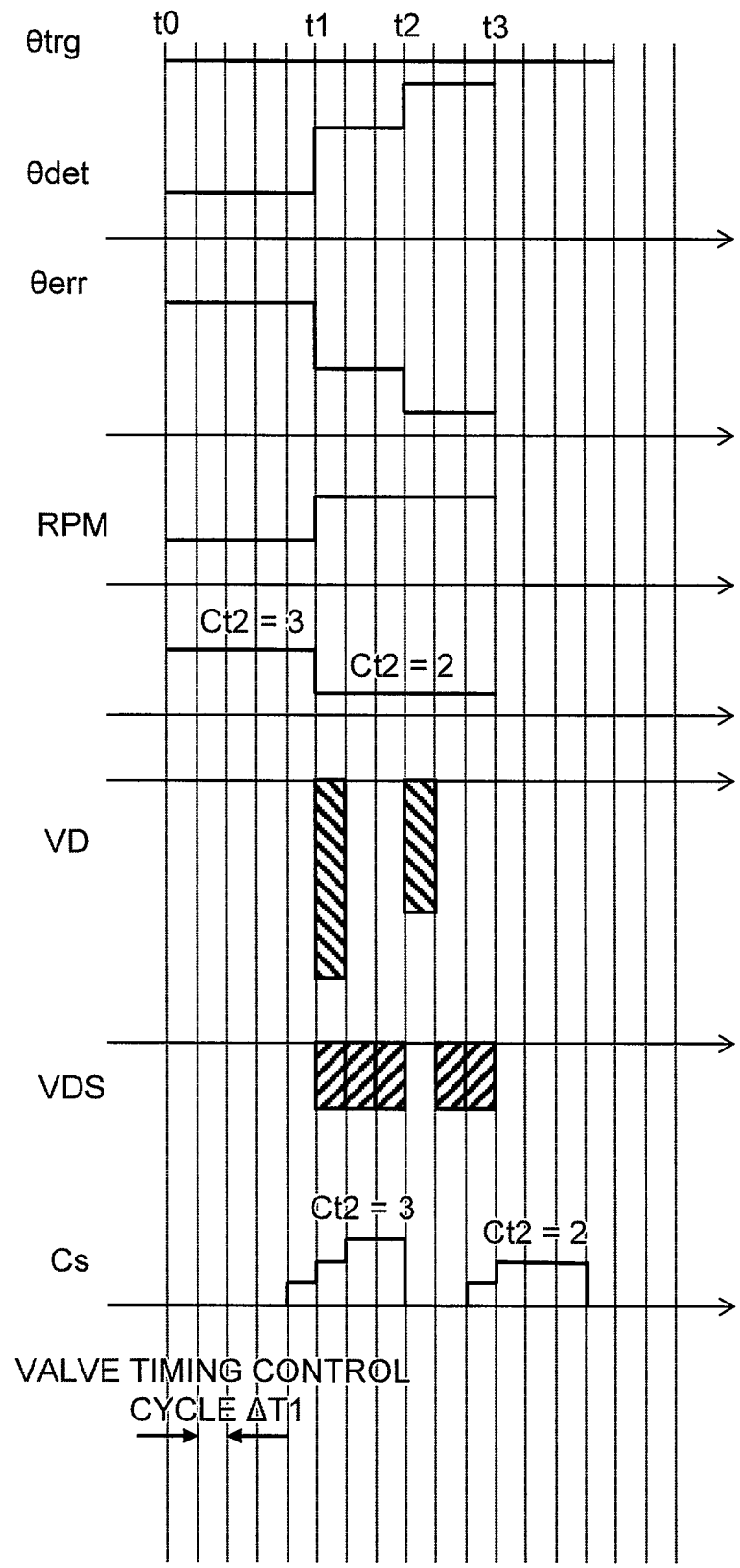
FIG. 10 is a timing chart of respective signals in the flowcharts illustrated in FIG. 8 and FIG. 9.

FIG. 8 and FIG. 9 are flowcharts illustrating a procedure of calculating a brake operation amount in a variable valve timing control device of an internal combustion engine according to a third embodiment of the present invention. Moreover, FIG. 10 is a timing chart of respective signals in the flowcharts illustrated in FIG. 8 and FIG. 9.

This third embodiment switches the number of divisions of the brake operation amount VD in response to the number of engine revolutions RPM as well as performs the control in the above-mentioned first embodiment.

Steps S301 to S305 and S308 to S315 in FIG. 8 and FIG. 9 are similar to Steps S101 to S113 in the first embodiment, and accordingly, a description thereof is omitted, and only different portions are described.

In Step S306, the number of engine revolutions RPM is read.

In the next Step S307, the number of divisions Ct2 of the brake operation amount VD, which corresponds to the number of engine revolutions RPM, is calculated. This number of divisions Ct2 is reduced as the number of engine revolutions RPM is increased. FIG. 10 illustrates an example where the number of divisions Ct2 is set at three during an interval between the pieces of VTC position detection timing t1 and t2 in which the number of engine revolutions RPM is low, where the number of divisions Ct2 is set at two during an interval between the pieces of timing t2 and t3.

The division of the brake operation amount VD can be realized by dividing the same into plural pieces, for example, by the low-pass filter, and by switching the filter coefficient in response to the number of engine revolutions RPM.

A reason why the number of divisions Ct2 is switched in response to the VTC angle detection cycle determined from the number of engine revolutions RPM as described above is that the optimum number of divisions differs because of the following reasons.

A first reason is that, since the VTC angle detection cycle becomes longer as the number of engine revolutions RPM is lower, a variation of the deviation amount is large, and the brake operation amount VD computed at one time is large. Hence, it is recommended to set the number of divisions Ct2 larger as the number of engine revolutions RPM is lower so that the operation amount after the division cannot be saturated.

A second reason is that, since the VTC angle detection cycle is longer as the number of engine revolutions RPM is lower, a period while the brake operation amount VD can be divided can be ensured to be long, and the number of divisions Ct2 can be increased.

As described above, the number of divisions of the brake operation amount VD is switched in response to the number of engine revolutions RPM, whereby the optimum number of divisions can be set in response to the VTC angle detection cycle determined from the number of engine revolutions RPM, and securement of braking force, the reduction of the effective current, and the decrease of the current variation, which are brought by the optimum differentiation amount, can be realized.

FIGS. 11A to 11D illustrate waveform diagrams of a cam phase angle, a control voltage, a motor current and a differentiation amount in a case where the number of engine revolutions is lower than in FIGS. 4A to 4D. As apparent from comparison between FIG. 4D and FIG. 11D, the intervals of the position detection timing differ from each other depending on the number of engine revolutions RPM, and the intervals become short in a case where the number of engine revolutions is high, and become long in a case where the number of engine revolutions is low. These intervals of the position detection timing are associated with characteristics of the filter, and an optimum filter coefficient differs depending on the position detection intervals.

Figure 11A:
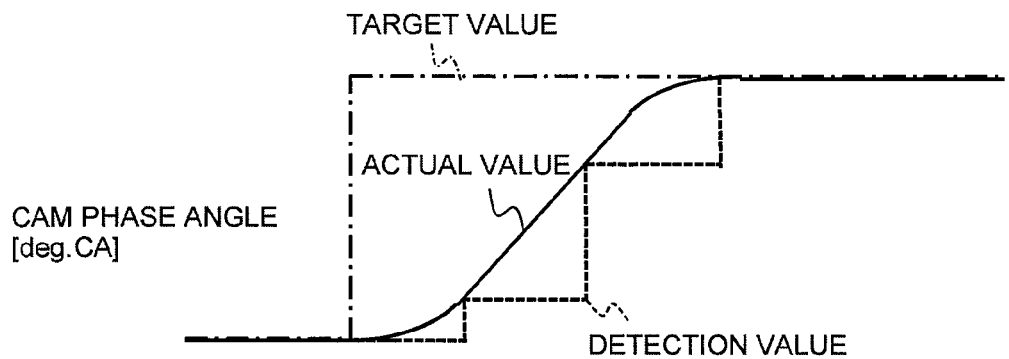
FIGS. 11A to 11D are waveform diagrams of a cam phase angle, a control voltage, a motor current and a differentiation amount at a small number of revolutions of the engine illustrated in FIG. 8 and FIG. 9.
Figure 11B:
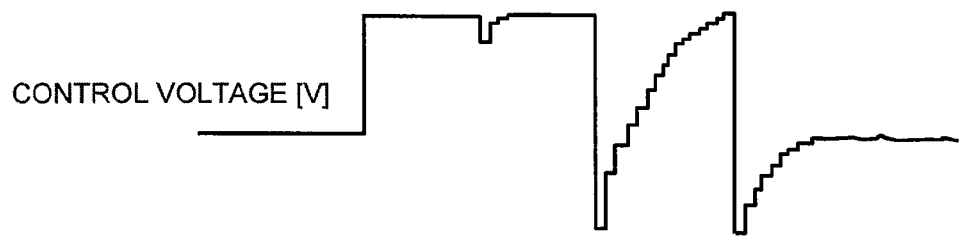
Figure 11C:
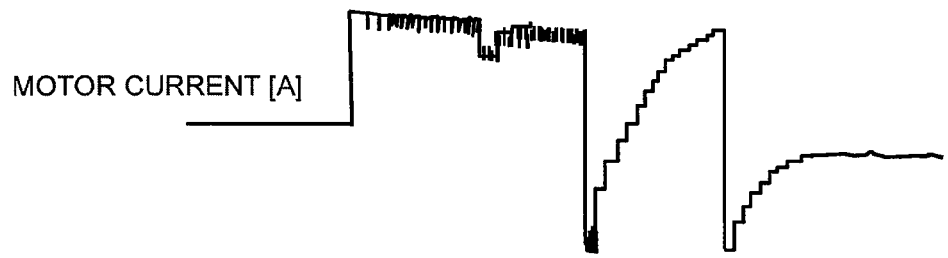
Figure 11D:
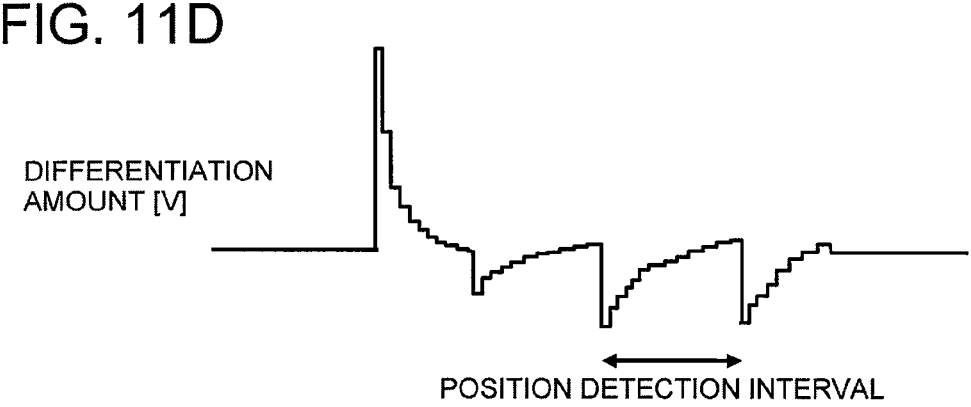

The differentiation amount illustrated in FIG. 11D and the differentiation amount illustrated in FIG. 4D are switched in response to the number of engine revolutions RPM, whereby the securement of the braking force and the reduction of the effective current, which are brought by the optimum differential amount, can be achieved.

Note that a switching parameter for the number of divisions is not limited to the number of engine revolutions RPM, and a number of rotations of a rotation unit in engine 1, for example, a crank rotation cycle, the VTC angle detection cycle or the like may be used.

[Fourth Embodiment]

Figure 12:
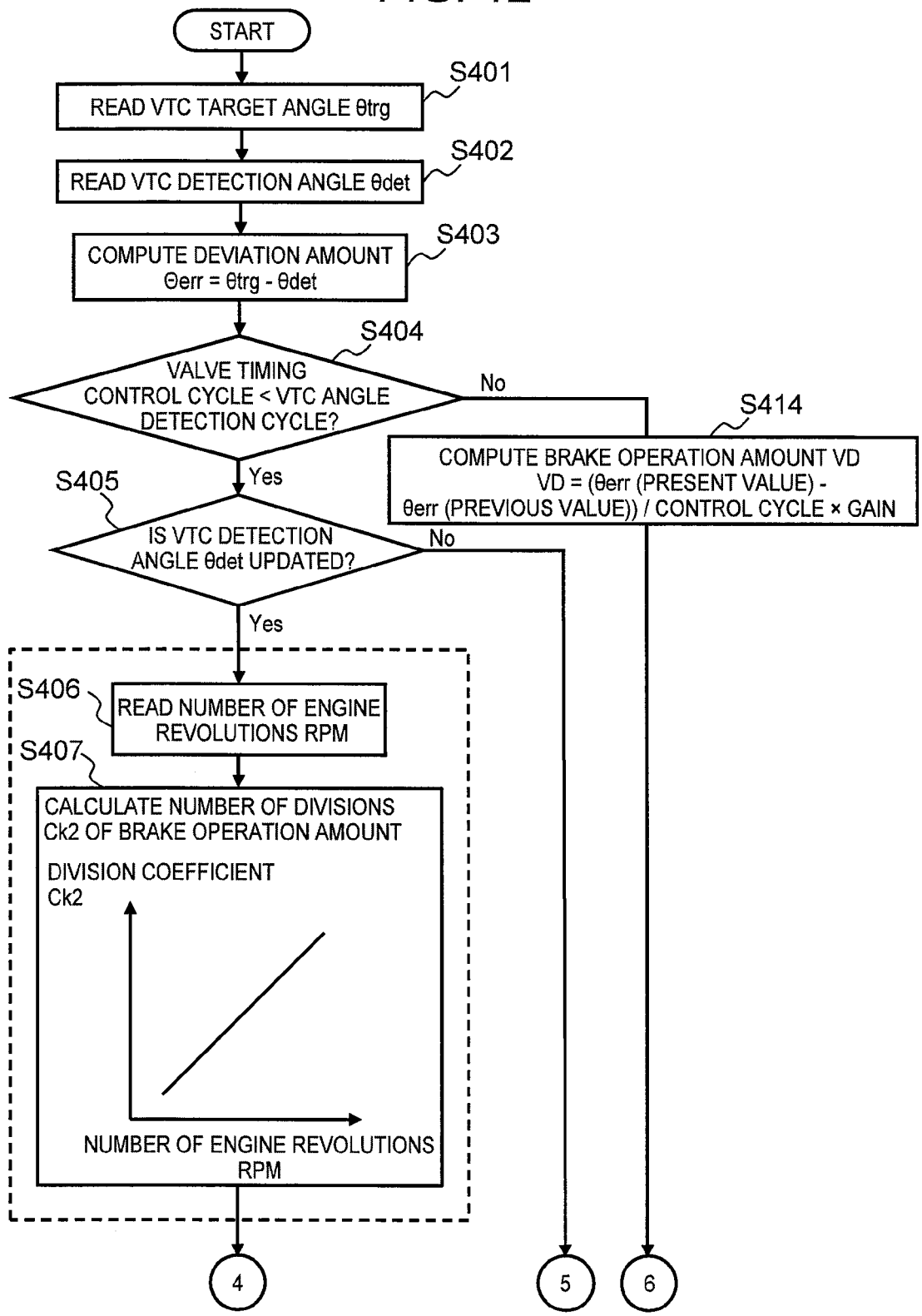
FIG. 12 is a flowchart illustrating a part of a procedure of calculating a brake operation amount in a variable valve timing control device of an internal combustion engine according to a fourth embodiment of the present invention.
Figure 13:
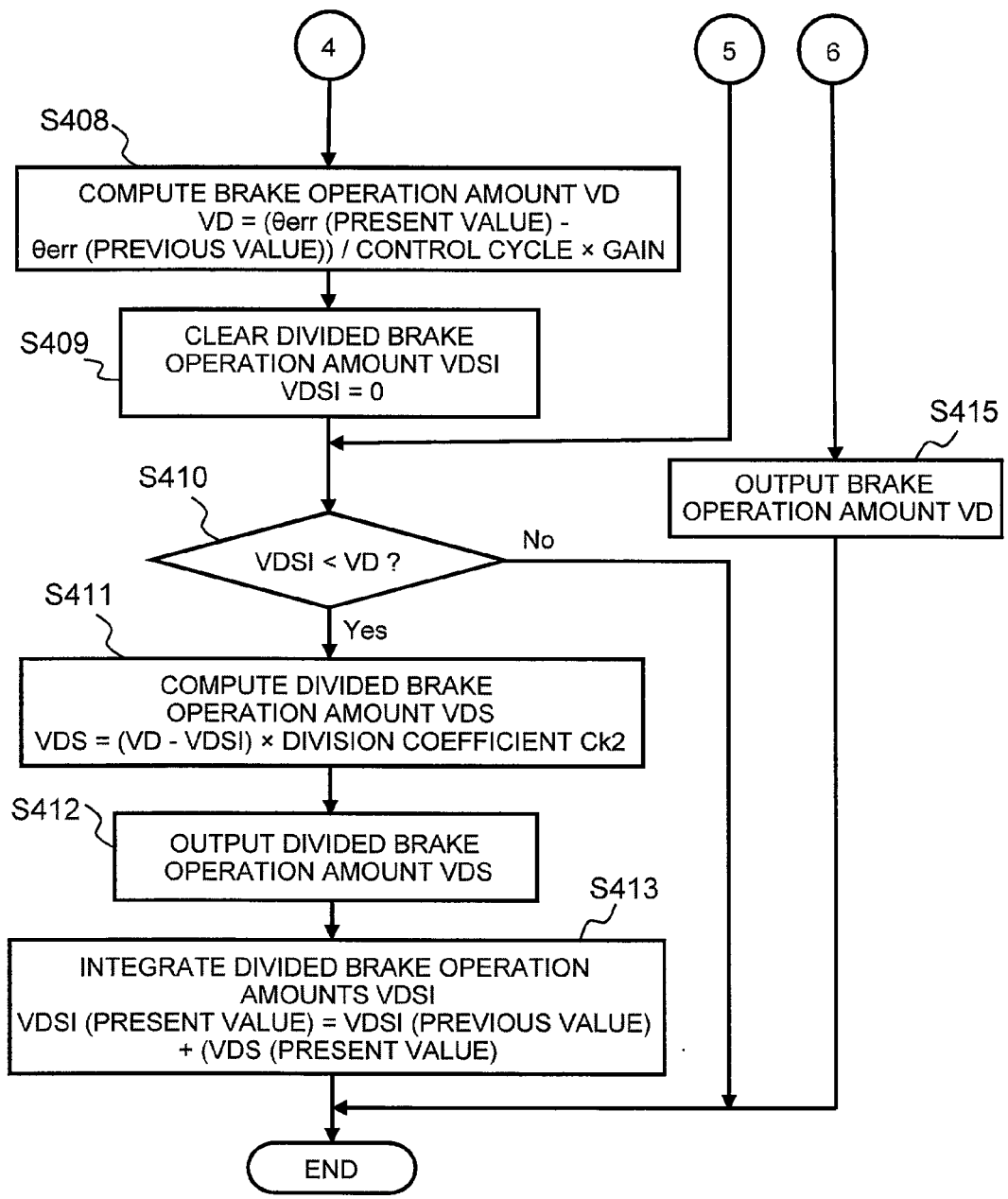
FIG. 13 is a flowchart illustrating a procedure subsequent to FIG. 12.
Figure 14:
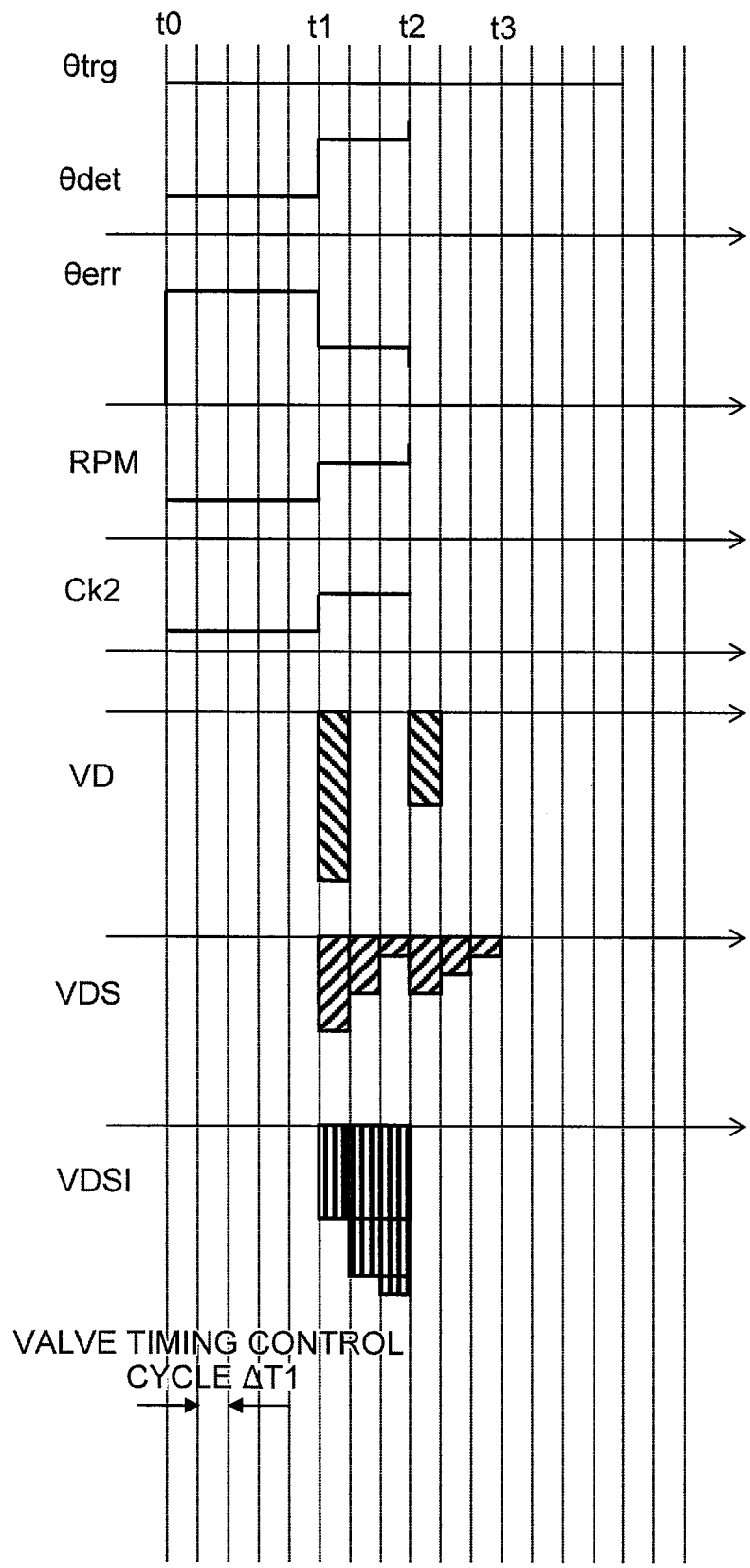
FIG. 14 is a timing chart of respective signals in the flowcharts illustrated in FIG. 12 and FIG. 13.

FIG. 12 and FIG. 13 are flowcharts illustrating a procedure of calculating a brake operation amount in a variable valve timing control device of an internal combustion engine according to a fourth embodiment of the present invention. Moreover, FIG. 14 is a timing chart of respective signals in the flowcharts illustrated in FIG. 12 and FIG. 13.

This fourth embodiment switches the number of divisions of the brake operation amount VD in response to the number of engine revolutions RPM in the above-mentioned second embodiment.

Steps S401 to S405 and S408 to S415 in FIG. 12 and FIG. 13 are similar to Steps S201 to S211 in the second embodiment, and accordingly, a description thereof is omitted, and only different portions are described.

In Step S406, the number of engine revolutions RPM is read.

In the next Step S407, the division coefficient Ck2 of the brake operation amount VD, which corresponds to the number of engine revolutions RPM, is calculated. This division coefficient Ck2 is increased as the number of engine revolutions RPM is increased.

Specifically, the division of the brake operation amount VD can be realized by dividing the same into plural pieces by the low-pass filter, and by switching the filter coefficient in response to the number of engine revolutions RPM.

A reason why the division coefficient Ck2 is switched in response to the VTC angle detection cycle determined from the number of engine revolutions RPM as described above is that the optimum division coefficient differs because of the following reasons.

A first reason is that, since the VTC angle detection cycle becomes longer as the number of engine revolutions RPM is lower, the variation of the deviation amount is large, and the brake operation amount VD computed at one time is large. Hence, it is recommended to set the division coefficient Ck2 smaller as the number of engine revolutions RPM is lower so that the operation amount after the division cannot be reached windup state.

A second reason is that, since the VTC angle detection cycle is longer as the number of engine revolutions RPM is lower, the period while the brake operation amount VD can be divided can be ensured to be long, and the division coefficient Ck2 can be reduced.

As described above, the division coefficient Ck2 is switched in response to the number of engine revolutions RPM, whereby the optimum division coefficient can be set in response to the VTC angle detection cycle determined from the number of engine revolutions RPM.

Note that, as in the third embodiment, a switching parameter for the division coefficient is not limited to the number of engine revolutions RPM, and the number of rotations of the rotation unit in engine 1, for example, the crank rotation cycle, the VTC angle detection cycle or the like may be used.

[Fifth Embodiment]

Figure 15:
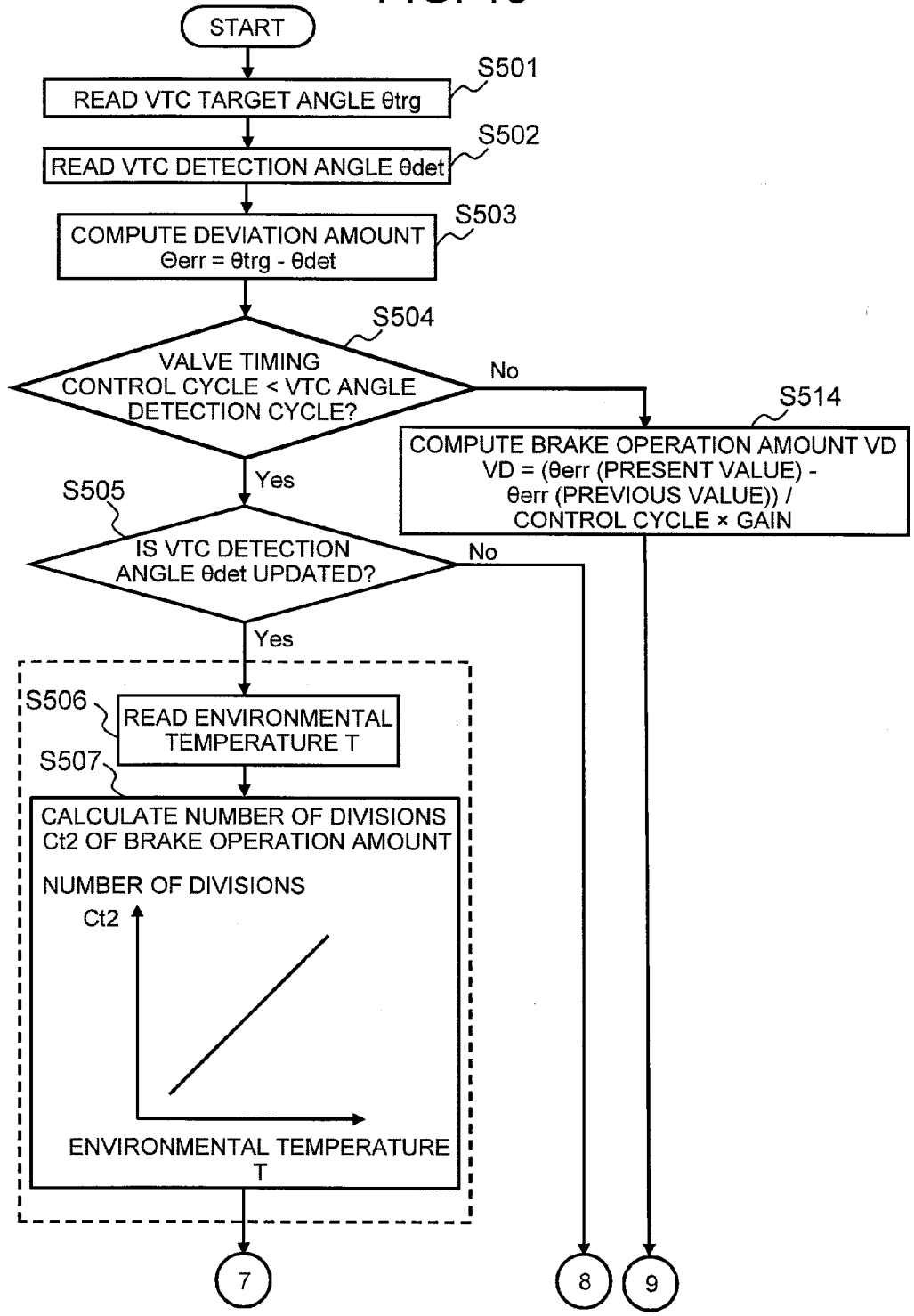
FIG. 15 is a flowchart illustrating a part of a procedure of calculating a brake operation amount in a variable valve timing control device of an internal combustion engine according to a fifth embodiment of the present invention.
Figure 16:
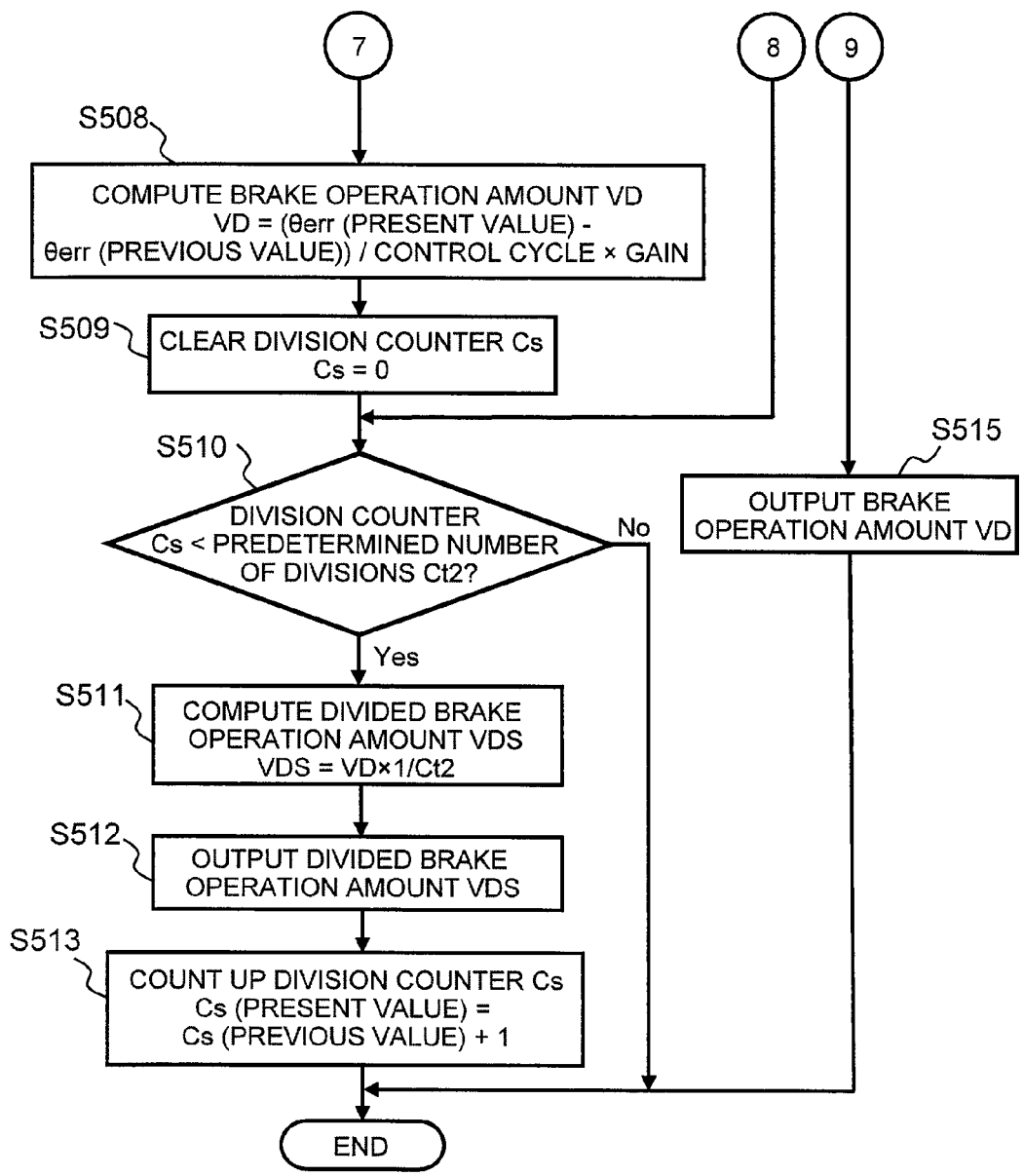
FIG. 16 is a flowchart illustrating a procedure subsequent to FIG. 15.

FIG. 15 and FIG. 16 are flowcharts illustrating a procedure of calculating a brake operation amount in a variable valve timing control device of an internal combustion engine according to a fifth embodiment of the present invention. This fifth embodiment switches a division method in response to an environmental temperature T of the electric VTC in addition to the above-mentioned control of the first embodiment.

Since a motor heat resistance limit becomes lower as the environmental temperature T is higher, the division method is switched so that the effective current cannot be increased. For example, the number of divisions is increased as the environmental temperature T is higher. Alternatively, the peak value of the brake operation amount is suppressed.

Steps S501 to S505 and S508 to S515 are similar to Steps S101 to S111 in the first embodiment, and accordingly, a description thereof is omitted, and only different portions are described.

In Step S506, the environmental temperature T measured by the temperature sensor 15 is read. Here, the environmental temperature T is defined to be a temperature such as an oil temperature, a coolant temperature, an ambient temperature, an intake air temperature and an electric VTC body temperature, which can establish a correlation with the electric VTC body.

In the next Step S507, the number of divisions Ct2 of the brake operation amount VD, which corresponds to the read environmental temperature T, is calculated. This number of divisions Ct2 is increased as the environmental temperature T rises.

The number of divisions Ct2 is switched in response to the environmental temperature T as described above, whereby the division method can be switched so that the effective current cannot be increased so that the environmental temperature T cannot exceed the motor heat resistance limit.

Specifically, when the environmental temperature T reaches a high temperature, the number of divisions Ct2 of the brake operation amount VD is increased, whereby the effective current to the motor is reduced, and in addition, the peak value of the brake operation amount is lowered, whereby heat generation of the motor can be suppressed.

[Sixth Embodiment]

Figure 17:
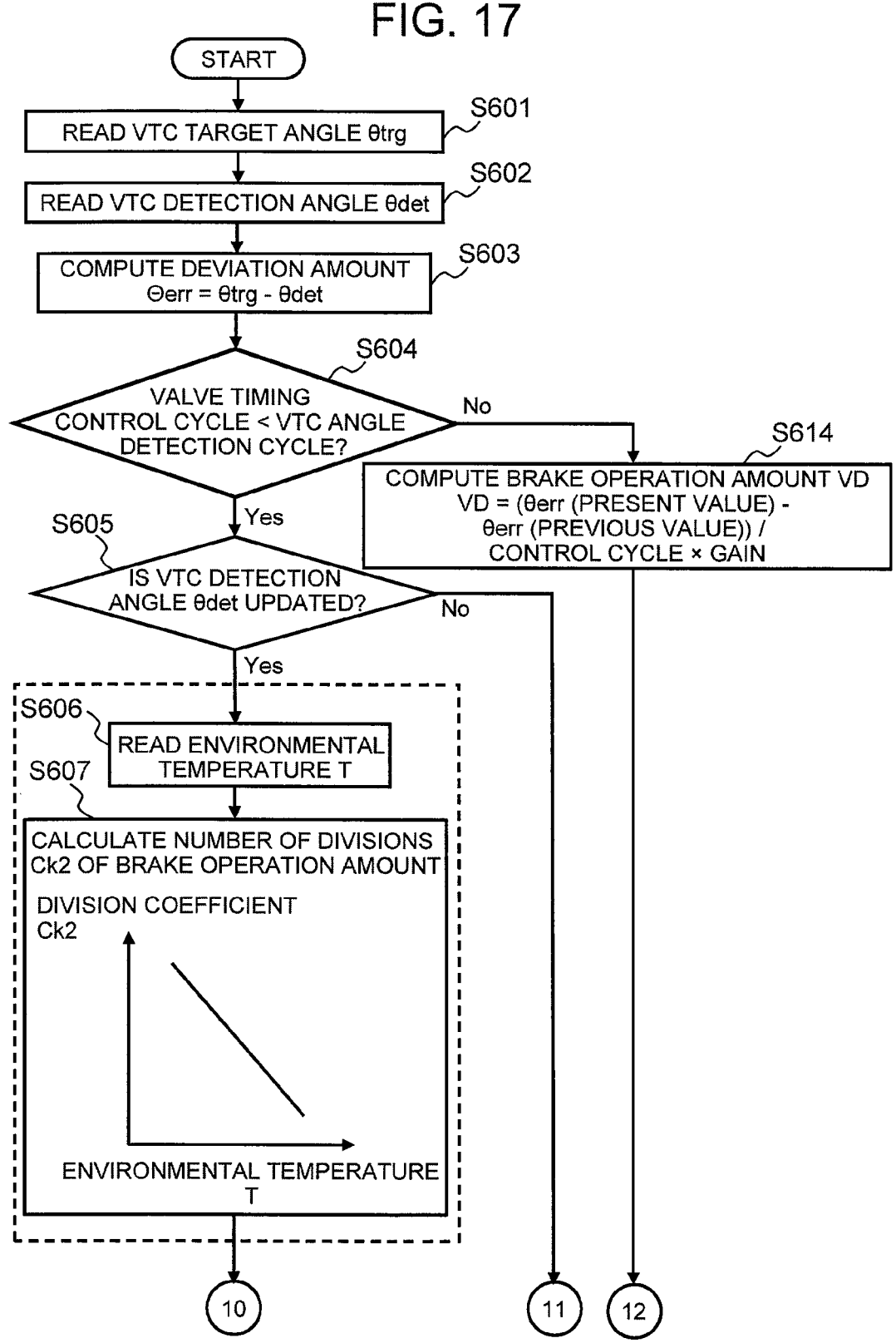
FIG. 17 is a flowchart illustrating a part of a procedure of calculating a brake operation amount in a variable valve timing control device of an internal combustion engine according to a sixth embodiment of the present invention.
Figure 18:
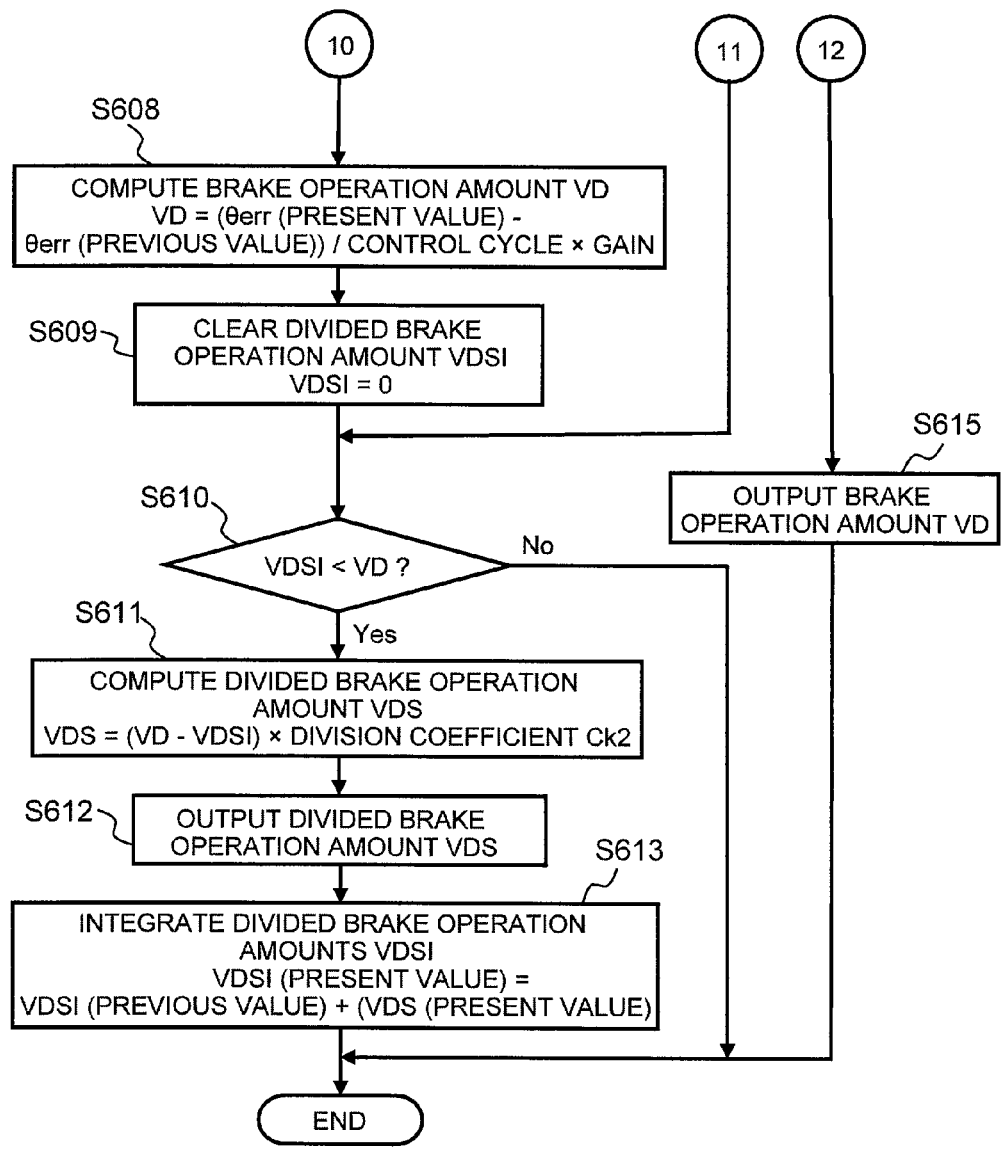
FIG. 18 is a flowchart illustrating a procedure subsequent to FIG. 17.

FIG. 17 and FIG. 18 are flowcharts illustrating a procedure of calculating a brake operation amount in a variable valve timing control device of an internal combustion engine according to a sixth embodiment of the present invention. This sixth embodiment switches the division method in response to the environmental temperature T of the electric VTC in addition to the above-mentioned control of the second embodiment.

As mentioned above, since the motor heat resistance limit becomes lower as the environmental temperature T is higher, the division method is switched so that the effective current cannot be increased. For example, the division coefficient is reduced as the environmental temperature T is higher. Alternatively, the peak value of the brake operation amount is suppressed.

Steps S601 to S605 and S608 to S615 are similar to Steps S201 to S211 in the second embodiment, and accordingly, a description thereof is omitted, and only different portions are described.

In Step S606, the environmental temperature T measured by temperature sensor 15 is read. Here, the environmental temperature T is defined to be a temperature such as an oil temperature, a coolant temperature, an ambient temperature, an intake air temperature and an electric VTC body temperature, which can establish a correlation with the electric VTC body.

In the next Step S607, the division coefficient Ck2 of the brake operation amount VD, which corresponds to the read environmental temperature T, is calculated. This division coefficient Ck2 is lowered as the environmental temperature T rises.

The division coefficient Ck2 is switched in response to the environmental temperature T as described above, whereby the division method can be switched so that the effective current cannot be increased in order that the environmental temperature T cannot exceed the motor heat resistance limit.

[Seventh Embodiment]

Figure 19:
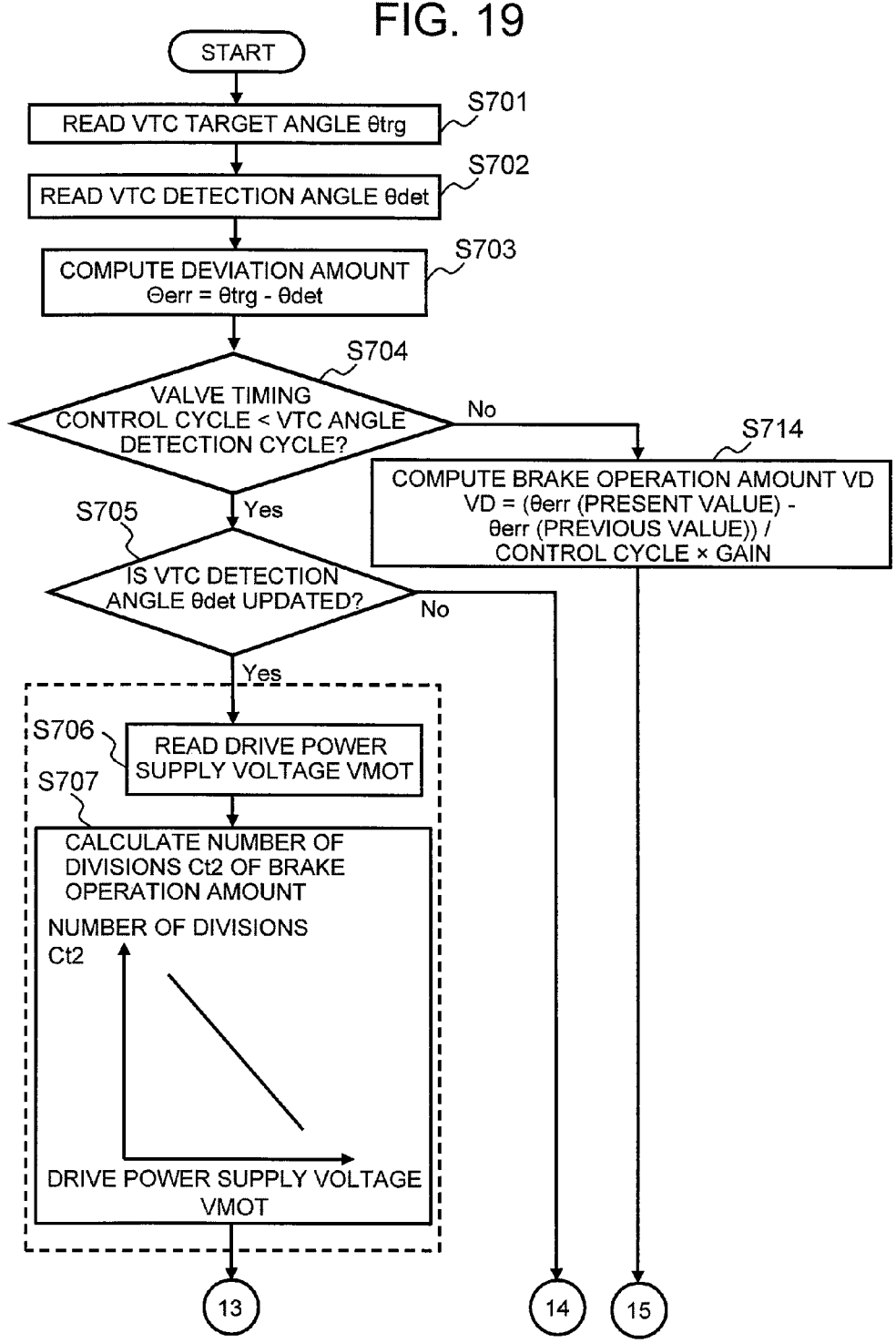
FIG. 19 is a flowchart illustrating a part of a procedure of calculating a brake operation amount in a variable valve timing control device of an internal combustion engine according to a seventh embodiment of the present invention.
Figure 20:
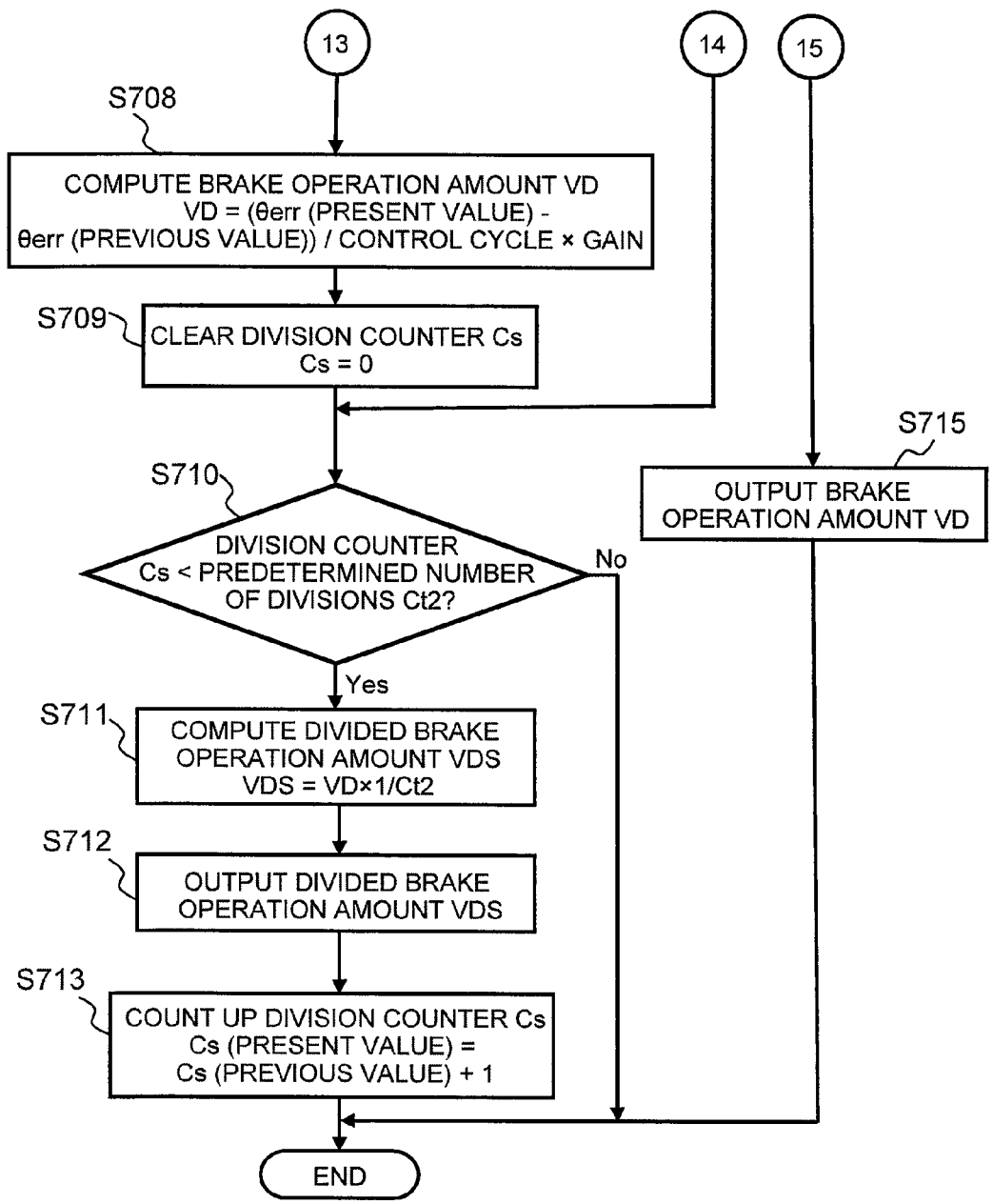
FIG. 20 is a flowchart illustrating a procedure subsequent to FIG. 19.

FIG. 19 and FIG. 20 are flowcharts illustrating a procedure of calculating a brake operation amount in a variable valve timing control device of an internal combustion engine according to a seventh embodiment of the present invention. This seventh embodiment switches the division method in response to the power supply voltage VMOT for driving the motor of the electric VTC in addition to the above-mentioned control of the first embodiment.

If the drive power supply voltage VMOT for driving the motor of the electric VTC is low, then the windup state of the brake operation amount VD becomes likely to occur, and accordingly, the number of divisions Ck2 is increased as the drive power supply voltage VMOT is lower. Alternatively, the peak value of the brake operation amount VD is suppressed.

Steps S701 to S705 and S708 to S715 are similar to Steps S101 to S111 in the first embodiment, and accordingly, a description thereof is omitted, and only different portions are described.

In Step S706, the drive power supply voltage VMOT for the electric VTC, which is measured by voltmeter 16, is read.

In the next Step S707, the number of divisions Ct2 of the brake operation amount VD, which corresponds to the read drive power supply voltage VMOT, is calculated. This number of divisions Ct2 is lowered as the drive power supply voltage VMOT rises.

The number of divisions Ct2 is switched in response to the drive power supply voltage VMOT as described above, whereby the saturation of the brake operation amount VD can be suppressed.

[Eighth Embodiment]

Figure 21:
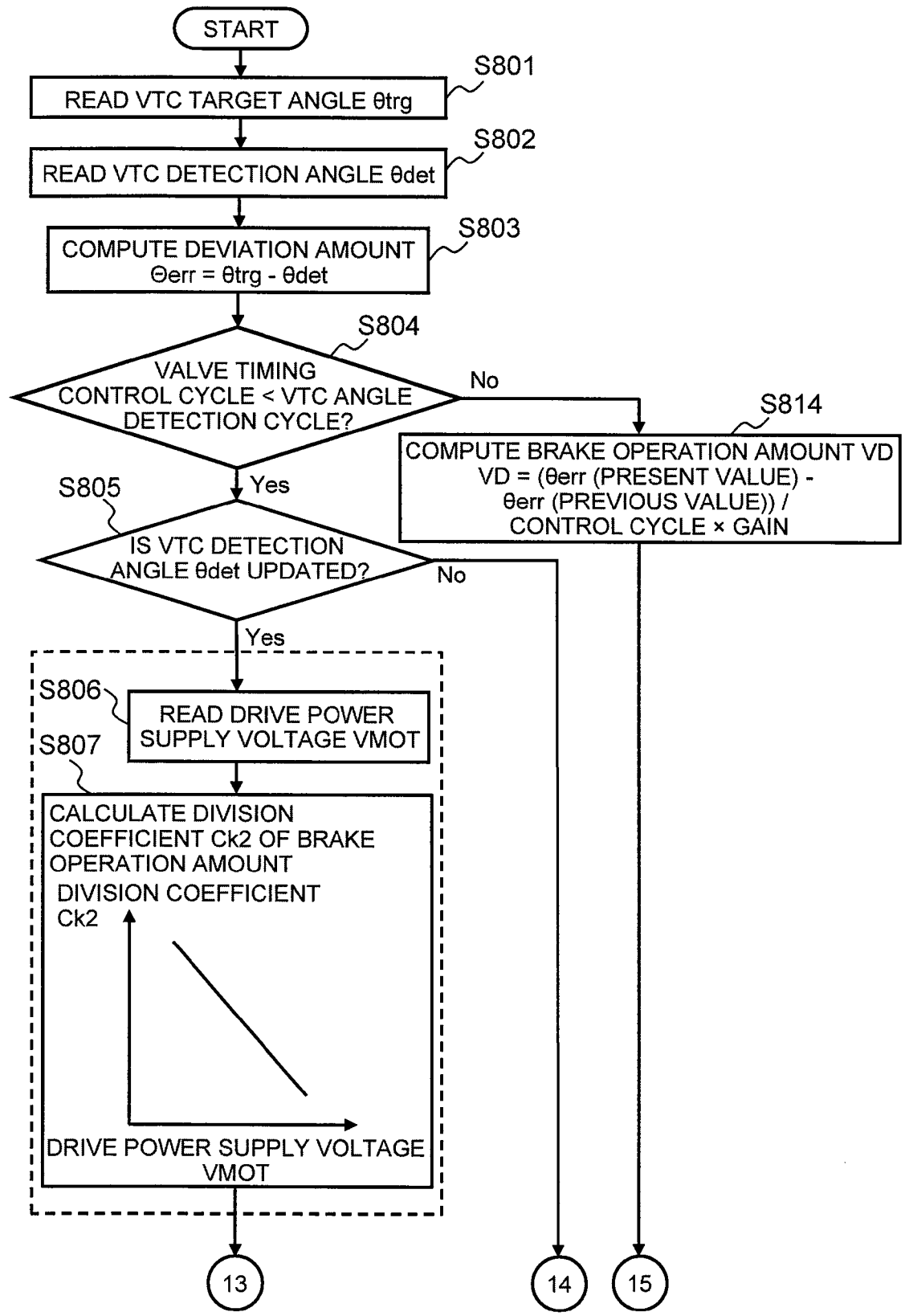
FIG. 21 is a flowchart illustrating a part of a procedure of calculating a brake operation amount in a variable valve timing control device of an internal combustion engine according to an eighth embodiment of the present invention.
Figure 22:
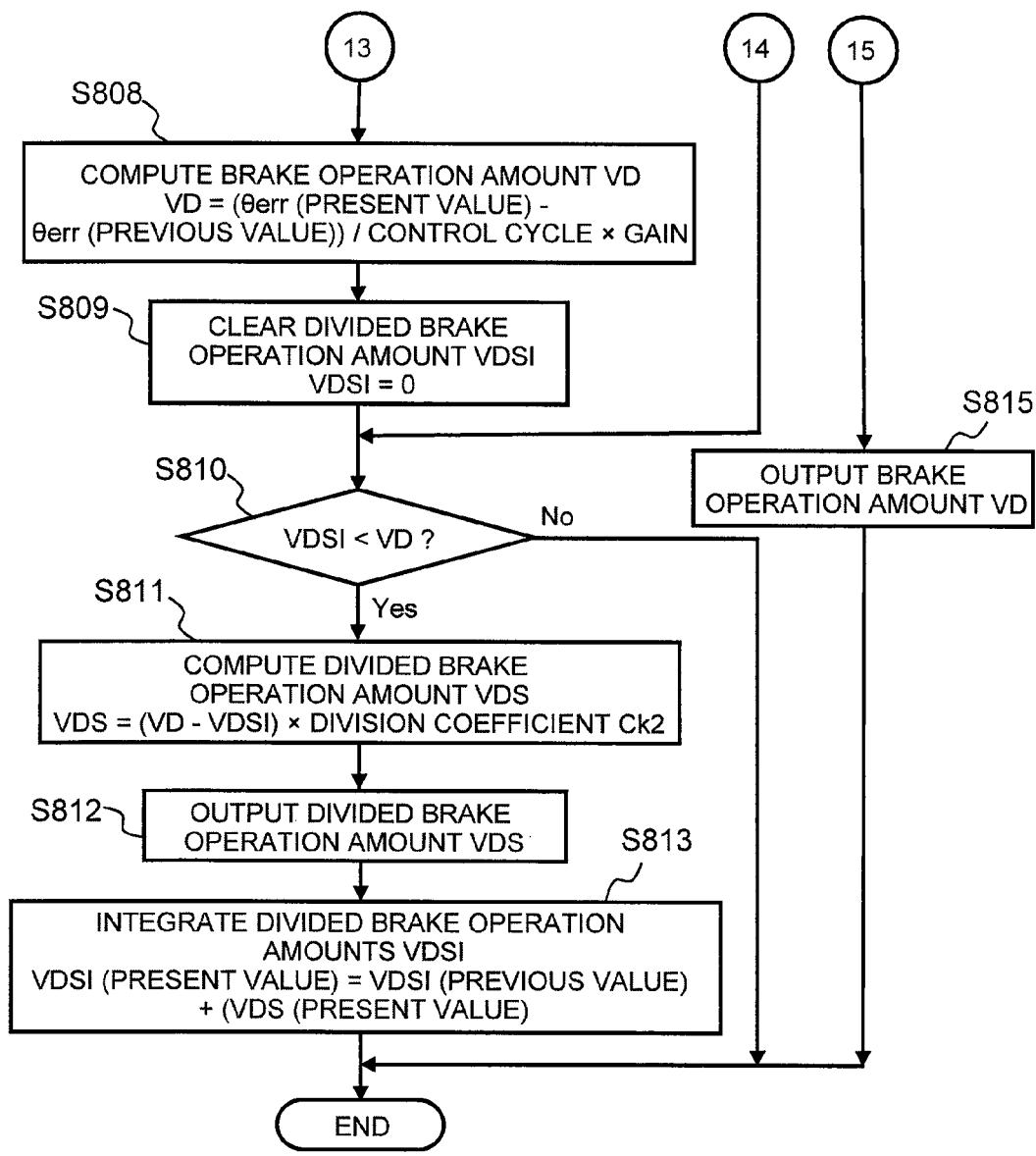
FIG. 22 is a flowchart illustrating a procedure subsequent to FIG. 21.

FIG. 21 and FIG. 22 are flowcharts illustrating a procedure of calculating a brake operation amount in a variable valve timing control device of an internal combustion engine according to an eighth embodiment of the present invention. This eighth embodiment switches the division method in response to the drive power supply voltage VMOT for the electric VTC in addition to the above-mentioned control of the second embodiment.

If the drive power supply voltage VMOT for the electric VTC is low, then the saturation of the brake operation amount VD becomes likely to occur, and accordingly, the division coefficient Ck2 is reduced as the drive power supply voltage VMOT is lower. Alternatively, the peak value of the brake operation amount VD is suppressed.

Steps S801 to S805 and S808 to S815 are similar to Steps S201 to S211 in the second embodiment, and accordingly, a description thereof is omitted, and only different portions are described.

In Step S806, the drive power supply voltage VMOT for the electric VTC, which is measured by voltmeter 16, is read.

In the next Step S807, the division coefficient Ck2 of the brake operation amount VD, which corresponds to the read drive power supply voltage VMOT, is calculated. This division coefficient Ck2 is lowered as the drive power supply voltage VMOT rises.

The division coefficient Ck2 is switched in response to the drive power supply voltage VMOT as described above, whereby the saturation of the brake operation amount VD can be suppressed.

As described above, in the valve timing control by the electric VTC, at the time when the engine starts (at the time when the engine is cranked) and when the number of engine revolutions is low, the engine can be controlled at the optimum valve timing from a default position of the VTC, the optimum valve timing corresponding to the engine conditions such as the environmental temperature including a coolant temperature and an oil temperature at the start of the engine, and such as the battery voltage. Hence, a balance can be struck between a fuel saving effect, which is brought by the fact that the intake valve is closed at later timing, and starting quality.

REFERENCE SYMBOL LIST

1 ENGINE (INTERNAL COMBUSTION ENGINE)
6 VALVE TIMING CONTROL SYSTEM (VTC)
9 CRANK ANGLE SENSOR
12 CAM ANGLE SENSOR
13 ECU (COMPUTING MEANS)
14 AIR FLOW METER
15 TEMPERATURE SENSOR
16 VOLTMETER
VD BRAKE OPERATION AMOUNT
VDS DIVIDED BRAKE OPERATION AMOUNT
Ct, Ct2 NUMBER OF DIVISIONS
Ck, Ck2 DIVISION COEFFICIENT

The invention claimed is:

1. A variable valve timing control device of an internal combustion engine, the variable valve timing control device controlling a valve timing control system that controls valve timing of the internal combustion engine, comprising:
an electronic control unit configured to adjust a valve timing in response to receiving an operation amount of the valve timing control system, the electronic control unit calculating a brake operation amount for controlling the valve timing, and dividing the brake operation amount calculated by the electronic control unit at position detection timing of the valve timing control system, and outputting a divided brake operation amount until next position detection timing, wherein the electronic control unit is configured to control a division method of the brake operation amount to switch so that the effective current cannot be increased when an environmental temperature reaches a high temperature, or to switch in response to a drive power supply voltage for a motor that drives the valve timing control system, and a number of divisions of the operation amount is increased when the drive power supply voltage for the motor that drives the valve timing control system is low.

2. The variable valve timing control device of an internal combustion engine according to claim 1, wherein the electronic control unit switches a division ratio of the brake operation amount in response to an angle detection cycle of the valve timing control system.

3. The variable valve timing control device of an internal combustion engine according to claim 2, wherein the electronic control unit performs division switching of the brake operation amount at the position detection timing of the valve timing control system.

4. The variable valve timing control device of an internal combustion engine according to claim 1, wherein the electronic control unit switches a division ratio of the brake operation amount in response to a number of revolutions of the internal combustion engine.

5. The variable valve timing control device of an internal combustion engine according to claim 4, wherein the electronic control unit performs division switching of the brake operation amount at the position detection timing of the valve timing control system.

6. The variable valve timing control device of an internal combustion engine according to claim 1, wherein the electronic control unit sets divided brake operation amounts initially large and gradually smaller.

7. The variable valve timing control device of an internal combustion engine according to claim 1, wherein the brake operation amount is a brake operation amount of a convergence control.

8. A variable valve timing control method for controlling a valve timing control system that changes valve timing of an internal combustion engine, the valve timing control system having an electronic control unit configured to adjust a valve timing in response to receiving an operation amount of the valve timing control system, the electronic control unit calculating a brake operation amount for controlling the valve timing, comprising the steps of:

calculating a brake operation amount for controlling the valve timing;

dividing the calculated brake operation amount at position detection timing of the valve timing control system; and outputting divided pieces of the brake operation amount until next position detection timing;

wherein the step of dividing the calculated brake operation amount at position detection timing of the valve timing control system further includes the step of:

dividing the brake operation amount into plural pieces by a filter; and setting a ratio of dividing the brake operation amount by a filter coefficient, and the step of dividing the brake operation amount into the plural pieces by the filter includes the step of:

switching a division method of the brake operation amount so that an effective current cannot be increased when an environmental temperature reaches a high temperature.

9. The variable valve timing control method of an internal combustion engine according to claim 8, wherein the step of calculating a brake operation amount for controlling the valve timing includes the steps of:

calculating target valve timing and detecting actual valve timing; and calculating the brake operation amount in response to a deviation between the target valve timing and the actual valve timing.

10. The variable valve timing control method of an internal combustion engine according to claim 8, wherein, after the step of setting a division ratio by a filter coefficient, the step of dividing the calculated brake operation amount at position detection timing of the valve timing control system further includes the step of:

switching the filter coefficient in response to a number of revolutions of the internal combustion engine.

\* \* \* \* \*